United States Patent
Smith

(10) Patent No.: US 11,682,295 B2
(45) Date of Patent: Jun. 20, 2023

(54) ADJUSTING HISTORICAL PROBE DATA FOR NEW ROAD GEOMETRY

(71) Applicant: HERE Global B.V., Eindhoven (NL)

(72) Inventor: Val Smith, Wilmette, IL (US)

(73) Assignee: HERE Global B.V., Eindhoven (NL)

( * ) Notice: Subject to any disclaimer, the term of this patent is extended or adjusted under 35 U.S.C. 154(b) by 511 days.

(21) Appl. No.: 16/446,766

(22) Filed: Jun. 20, 2019

(65) Prior Publication Data
US 2020/0402394 A1 Dec. 24, 2020

(51) Int. Cl.
- G08G 1/01 (2006.01)
- G06F 16/23 (2019.01)
- G06F 16/29 (2019.01)

(52) U.S. Cl.
CPC ........... *G08G 1/0129* (2013.01); *G06F 16/23* (2019.01); *G06F 16/29* (2019.01); *G08G 1/0112* (2013.01)

(58) Field of Classification Search
CPC .. G08G 1/0129; G08G 1/0112; G08G 1/0133; G08G 1/0141; G06F 16/23; G06F 16/29
See application file for complete search history.

(56) References Cited

U.S. PATENT DOCUMENTS

| | | | | |
|---|---|---|---|---|
| 8,332,132 | B2 * | 12/2012 | Groenhuijzen | G08G 1/091 701/119 |
| 9,720,415 | B2 * | 8/2017 | Levinson | G01S 7/497 |
| 10,151,596 | B2 * | 12/2018 | Stankoulov | G06T 11/203 |

| | | | | |
|---|---|---|---|---|
| 2009/0319188 | A1 * | 12/2009 | Otto | G06F 16/29 701/300 |

(Continued)

FOREIGN PATENT DOCUMENTS

CN 103593535 A 2/2014

OTHER PUBLICATIONS

Herring, *Real-Time Traffic Modeling and Estimation With Streaming Probe Data Using Machine Learning*, UC Berkeley, ProQuest ID: Herring_berkeley_0028E_11013. Merritt ID: ark:/13030/m5k35zks, (2010), 139 pages. [Retrieved from the Internet Jun. 25, 2019] <https://escholarship.org/uc/item/2n79334p#author>.

*Primary Examiner* — Thomas E Worden
*Assistant Examiner* — Daniel Tyler Reich
(74) *Attorney, Agent, or Firm* — Alston & Bird LLP

(57) ABSTRACT

An apparatus receives instances of probe data each comprising location data. The apparatus identifies instances of probe data corresponding to a first traversable map element (TME) of a current map version based on the location data and the current map version. The apparatus determines a current traffic measure for the first TME based on the probe data. The apparatus determines a historical traffic measure corresponding to a second TME of a previous map version that corresponds to the first TME of the current map version and a scaling factor for the first and second TMEs. The apparatus determines a scaled historical traffic measure by applying the scaling factor to the historical traffic measure and compares the current traffic measure and the scaled historical traffic measure. Responsive to determining that the comparison does not satisfy a similarity threshold requirement, the apparatus generates updated map/traffic data for the first TME.

20 Claims, 7 Drawing Sheets

(56) References Cited

U.S. PATENT DOCUMENTS

| | | | |
|---|---|---|---|
| 2011/0106416 A1* | 5/2011 | Scofield | G08G 1/0104 |
| | | | 701/119 |
| 2012/0023057 A1* | 1/2012 | Winberry | G01C 21/32 |
| | | | 706/50 |
| 2012/0054145 A1* | 3/2012 | Suzuki | G06N 5/04 |
| | | | 706/52 |
| 2014/0278055 A1* | 9/2014 | Wang | G01C 21/3841 |
| | | | 701/409 |
| 2016/0069695 A1* | 3/2016 | Broadbent | G01C 21/3415 |
| | | | 701/411 |
| 2016/0102987 A1 | 4/2016 | Ding et al. | |
| 2017/0309171 A1 | 10/2017 | Zhao et al. | |
| 2019/0301891 A1* | 10/2019 | Rowitch | G01C 21/32 |

\* cited by examiner

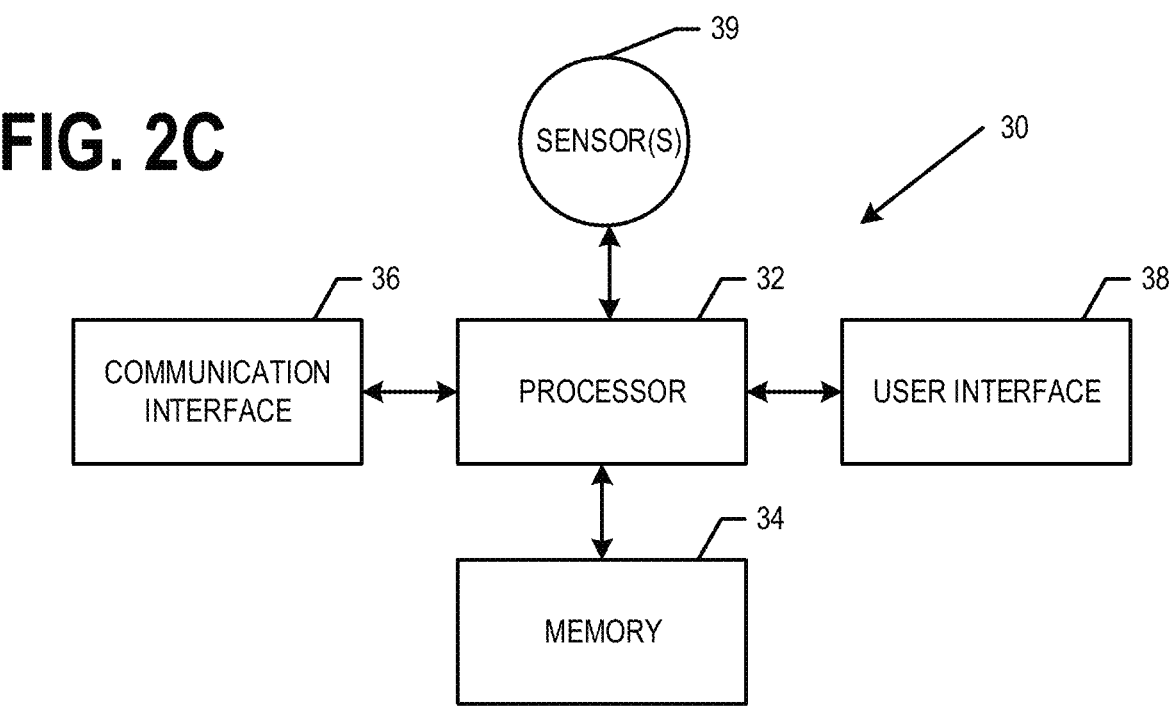

ADJUSTING HISTORICAL PROBE DATA FOR NEW ROAD GEOMETRY

TECHNOLOGICAL FIELD

An example embodiment relates generally to the use of historical probe data in determining current traffic conditions. An example embodiment relates generally to adjusting historical probe data associated with a previous map version based on changes to road geometry between the release of the previous map version and the release of a current map version.

BACKGROUND

Historical probe information/data may be used to determine expected traffic characteristics. When probe information/data is received, the probe information/data is map-matched to a traversable map element (TME) using a map version that is the current version at that period of time. However, in future map versions, the geometry of one or more TMEs may change. It is prohibitive in time and money to update all the archived, historical probe information/data to the current map version every time a new map version is released due to the volume of archived historical probe information/data. Thus, historical models built on older map versions and historical probe information/data end up being applied to real time processing, which tends to lead to errors in predictions corresponding to TMEs when a TME of the current map version has changed compared to corresponding TMEs of previous map versions corresponding to the archived historical probe information/data.

BRIEF SUMMARY OF SOME EXAMPLE EMBODIMENTS

Various embodiments provide a technical solution to the technical problem of analyzing current probe information/data based on historical models generated based on historical traffic information/data. The historical traffic information/data corresponds to one or more previous map versions (e.g., map versions A, A1, A2, and/or the like) and the current probe information/data is map-matched to a current map version (e.g., map version B). For example, probe information/data may be map-matched to TMEs to determine current traffic conditions corresponding to TMEs of the current map version (e.g., map version B). Changes in road geometry between the previous map versions (e.g., map version A and/or the like) and the current map version (e.g., map version B) may cause models generated based on the historical traffic information/data to provide erroneous predictions corresponding to TMEs of the current map version (e.g., map version B). Due to the volume of archived probe information/data used to generate the historical traffic information/data, it is prohibitive to map match each instance of archived probe information/data to the current map version each time a new map version is released. Various embodiments of the present invention use a scaled model generated based on the historical traffic information/data to provide predictions corresponding to TMEs of the current map version (e.g., map version B). In various embodiments, the scaling of the model reduces the errors introduced by changes in the road geometry between the previous map version and the current map version such that the scaled model predictions may be used to make accurate determinations regarding current traffic conditions.

In various embodiments, probe apparatuses onboard vehicles traveling through at least a portion of a road network may capture instances of probe information/data via one or more sensors onboard the corresponding vehicles. In various embodiments, the probe information/data includes location information/data that indicates a location of the vehicle when the probe information/data was captured. In an example embodiment, the probe information/data may further include a timestamp indicating a date and/or time when the probe information/data was captured, a heading of the vehicle when the probe information/data was captured, a speed with which the vehicle was traveling when the probe information/data was captured, information/data corresponding to the environment about the vehicle, and/or the like. The probe apparatuses may then provide one or more instances of probe information/data (e.g., including location information/data, a timestamp, and/or the like).

A network apparatus may receive a plurality of instances of probe information/data. The network apparatus may be configured to map match each instance of probe information/data to a TME of a digital map representing a road network based on the location information/data of the probe information/data. In particular, the network apparatus may use the location information/data of an instance of probe information/data to map match an instance of probe information/data to a TME of a map version of the digital map that is the current map version at the time when the map matching is being performed. In various embodiments, a TME is a link corresponding to a road segment of a road network or a lane corresponding to a travel lane of a road segment of the road network. In various embodiments, a road segment is a length of roadway that is defined by a first intersection or node and a second intersection or node. In an example embodiment, each instance of probe information/data is matched to an epoch based on a timestamp of the instance of probe information/data. An epoch is a predefined period or window of time that may be defined by a date of the year, day of the week, and/or time of day. In an example embodiment, an epoch is a fifteen minute period of time with a defined start and stop date and/or time. The instances of probe information/data may be archived in association with metadata identifying the map version to which the instances of probe information/data was map-matched. In an example embodiment, the instances of probe information/data map-matched to a particular TME and time-matched to a particular epoch are analyzed to determine traffic information/data corresponding to the particular TME and the particular epoch. In an example embodiment, the traffic information/data is stored and/or archived in addition to and/or instead of the instances of probe information/data. In an example embodiment, the traffic information/data may be stored and/or archived in association with metadata comprising a TME identifier configured to identify the particular TME, an epoch identifier configured to identify the particular epoch, a map version identifier configured to identify the map version used to map match the instances of probe information/data that was used to generate the traffic information/data, and/or the like.

In various embodiments, the network apparatus is configured to determine current traffic conditions and/or updated map information/data based on comparing current traffic measures (e.g., traffic measures used to describe the current traffic conditions) to historical traffic measures (e.g., traffic measures used to describe historical/past traffic conditions). For example, the network apparatus may analyze current probe information/data to determine current traffic measures for a first TME and analyze historical traffic information/data to determine historical traffic measures for a second TME of the previous map version that corresponds to the first TME of the current map version. In various embodiments, a second TME of a previous map version corresponds to a first TME of a current map version when the first and second TMEs overlap at least in part and/or share a defining starting/ending point or node.

A scaling factor is applied to the historical traffic measures. The scaling factor is configured to scale the historical traffic measures based on changes in road geometry corresponding to the second TME associated with a previous map version and historical traffic measures. and the first TME associated with the current map version. The network apparatus may then determine if the scaled historical traffic measures corresponding to the first TME and the current traffic measures corresponding to the first TME satisfy a similarity threshold requirement. If it is determined that the similarity threshold requirement is satisfied by the scaled historical traffic measures and the current traffic measures corresponding to the first TME, it is determined that the map information/data corresponding to the first TME is up to date, traffic conditions along the first TME are as expected, and/or the like. If it is determined that the similarity threshold requirement is not satisfied by the scaled historical traffic measures and the current traffic measures corresponding to the first TME, it is determined that the map information/data corresponding to the first TME is not up to date and/or that traffic conditions along the first TME are different from expected. In an example embodiment, the scaled historical traffic measures indicate an expected volume of traffic along the first TME during a particular epoch and the current traffic measure indicates the current volume of traffic along the first TME. In such an embodiment, when the scaled historical traffic measures and the current traffic measures corresponding to the first TME do not satisfy the similarity threshold requirement, it may be determined that the first TME and/or a portion of the TME is closed (e.g., due to construction, an accident, a stalled vehicle, debris on the road, and/or the like). For example, the comparison of the scaled historical traffic measures and the current traffic measures corresponding to the first TME may be used to automatically identify complete and/or partial road segment and/or travel lane closures and/or to automatically verify complete and/or partial road segment and/or travel lane closures corresponding to the first TME.

In various embodiments, in response to determining that the scaled historical traffic measures and the current traffic measures corresponding to the first TME do not satisfy the similarity threshold requirement, the network apparatus may generate updated map information/data corresponding to the first TME. For example, the updated map information/data may indicate that the first TME is experiencing a partial or complete closure. For example, the updated map information/data may indicate that the first TME is experiencing traffic conditions that differ from the traffic conditions expected along the first TME, and/or the like. In an example embodiment, the updated map information/data may include information/data regarding current traffic conditions along the first TME. The network apparatus may provide the updated map information/data to at least one vehicle apparatus. In an example embodiment, the network apparatus provides the updated map information/data as part of a map tile of a digital map and/or as part of digital map. For example, the updated map information/data may be provided as part of a data record corresponding to the first TME and stored in a geographic database of a digital map. For example, the map tile of the digital map may provide a representation of the road network (e.g., in the form of a geographic database) in a geographical area comprising the road segment and/or travel lane of the road segment corresponding to the first TME. In various embodiments, the network apparatus may provide the updated map information/data and/or digital map and/or digital map tile comprising the updated map information/data such that one or more vehicle apparatuses receive the updated map information/data, digital map, and/or digital map tile and use at least a portion of the updated map information/data for performing one or more navigation functions.

In various embodiments, a vehicle apparatus is onboard a vehicle. In various embodiments, a vehicle apparatus may receive updated map information/data or a digital map and/or digital map tile(s) comprising updated map information/data. The vehicle apparatus may then use at least a portion of the updated map information/data to perform one or more navigation functions. Some non-limiting examples of navigation functions include localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, provision of safety alerts, and/or the like. For example, in an example embodiment, a vehicle apparatus may modify a route to avoid a first TME that is experiencing a complete and/or partial closure according to the updated map information/data.

In an example embodiment, a network apparatus receives a plurality of instances of current probe data. Each instance of current probe data comprises location data indicating a location of a vehicle having a probe apparatus onboard when the instance of current probe data was captured by the probe apparatus. The network apparatus comprises a processor, a memory, and a communications interface configured to communicate via at least one network. The network apparatus identifies instances of current probe data from the plurality of instances of current probe data corresponding to a first traversable map element (TME) of a current map version based on the location data of the instances of current probe data and the current map version; determines a current traffic measure for the first TME based on the identified instances of current probe data; accesses historical traffic data corresponding to a second TME of a previous map version that corresponds to the first TME of the current map version; determines a scaling factor based on current map data corresponding to the first TME from the current map version and previous map data corresponding to the second TME from the previous map version; determines a scaled historical traffic measure for the first TME based on the historical traffic data and the scaling factor; and compares the current traffic measure and the scaled historical traffic measure. The historical traffic data is associated with the previous map version. Responsive to determining that a result of the comparison of the current traffic measure and the scaled historical traffic measure does not satisfy a similarity threshold requirement, the network apparatus generates updated map data corresponding to the first TME.

According to an aspect of the present invention, a method for determining whether current traffic information matches expectations determined based on historical traffic information is provided. In an example embodiment, the method comprises receiving a plurality of instances of current probe data by a network apparatus. The network apparatus comprises a processor, a memory, and a communications interface configured to communicate via at least one network. Each instance of current probe data comprises location data indicating a location of a vehicle having a probe apparatus onboard when the instance of current probe data was captured by the probe apparatus. The method further comprises identifying, by the network apparatus, instances of current probe data from the plurality of instances of current probe data corresponding to a first TME of a current map version based on the location data of the instances of current probe data and the current map version. The method further comprises determining, by the network apparatus, a current traffic measure for the first TME based on the identified instances of current probe data; and accessing, by the network apparatus, historical traffic data corresponding to a second TME of a previous map version that corresponds to the first TME of the current map version. The historical traffic data is associated with the previous map version. The method further comprises determining, by the network apparatus, a scaling factor based on current map data corresponding to the first TME from the current map version and previous map data corresponding to the second TME from the previous map version. The method further comprises determining, by a network apparatus, a scaled historical traffic measure for the first TME based on the historical traffic data and the scaling factor; and comparing, by the network apparatus, the current traffic measure and the scaled historical traffic measure. The method further comprises, responsive to determining that a result of the comparison of the current traffic measure and the scaled historical traffic measure does not satisfy a similarity threshold requirement, generating, by the network apparatus, updated map data corresponding to the first TME.

In an example embodiment, the method further comprises providing the updated map data to at least one vehicle apparatus. The at least one vehicle apparatus is configured to perform a navigation function based on the updated map data. In an example embodiment, the updated map data is provided as part of a map tile corresponding to a new map version. In an example embodiment, the current map data comprises a first length of the first TME, the previous map data comprises a second length of the second TME, and the scaling factor is proportional to a ratio of the first length and the second length. In an example embodiment, the current traffic measure is a current volume of traffic and the scaled historical traffic measure is a historical volume of traffic scaled based on the scaling factor. In an example embodiment, the current volume of traffic and the historical volume of traffic are both associated with an epoch. In an example embodiment, the historical traffic data comprises and/or is determined based on historical probe data that has been map-matched to the previous map version. In an example embodiment, the method further comprises, responsive to determining that the result of the comparison of the current traffic measure and the scaled historical traffic measure does satisfy a similarity threshold, determining that the current map data corresponding to the first TME is up to date. In an example embodiment, the method further comprises, responsive to determining that a result of the comparison of the current traffic measure and the scaled historical traffic measure does not satisfy a similarity threshold requirement, determining that the first TME or a portion of the first TME is currently closed to traffic. In an example embodiment, a TME is a link corresponding to a road segment or a lane corresponding to a travel lane of a road segment.

According to another aspect of the present invention, an apparatus is provided. In an example embodiment, the apparatus comprises at least one processor, a communications interface configured for communicating via at least one network, and at least one memory storing computer program code. The at least one memory and the computer program code are configured to, with the processor, cause the apparatus to at least receive a plurality of instances of current probe data. Each instance of current probe data comprises location data indicating a location of a vehicle having a probe apparatus onboard when the instance of current probe data was captured by the probe apparatus. The at least one memory and the computer program code are further configured to, with the processor, cause the apparatus to at least identify instances of current probe data from the plurality of instances of current probe data corresponding to a first TME of a current map version based on the location data of the instances of current probe data and the current map version; determine a current traffic measure for the first TME based on the identified instances of current probe data; access historical traffic data corresponding to a second TME of a previous map version that corresponds to the first TME of the current map version, the historical traffic data associated with the previous map version; determine a scaling factor based on current map data corresponding to the first TME from the current map version and previous map data corresponding to the second TME from the previous map version; determine a scaled historical traffic measure for the first TME based on the historical traffic data and the scaling factor; and compare the current traffic measure and the scaled historical traffic measure. The at least one memory and the computer program code are further configured to, with the processor, cause the apparatus to at least, responsive to determining that a result of the comparison of the current traffic measure and the scaled historical traffic measure does not satisfy a similarity threshold requirement, generate updated map data corresponding to the first TME.

In an example embodiment, the at least one memory and the computer program code are further configured to, with the processor, cause the apparatus to at least provide the updated map data to at least one vehicle apparatus. The at least one vehicle apparatus is configured to perform a navigation function based on the updated map data. In an example embodiment, the updated map data is provided as part of a map tile corresponding to a new map version. In an example embodiment, the current map data comprises a first length of the first TME, the previous map data comprises a second length of the second TME, and the scaling factor is proportional to a ratio of the first length and the second length. In an example embodiment, the current traffic measure is a current volume of traffic and the scaled historical traffic measure is a historical volume of traffic scaled based on the scaling factor. In an example embodiment, the current volume of traffic and the historical volume of traffic are both associated with an epoch. In an example embodiment, the historical traffic data comprises and/or is determined based on historical probe data that has been map-matched to the previous map version. In an example embodiment, the at least one memory and the computer program code are further configured to, with the processor, cause the apparatus to at least, responsive to determining that the result of the comparison of the current traffic measure and the scaled historical traffic measure does satisfy a similarity threshold, determine that the current map data corresponding to the first TME is up to date. In an example embodiment, the at least one memory and the computer program code are further configured to, with the processor, cause the apparatus to at least, responsive to determining that a result of the comparison of the current traffic measure and the scaled historical traffic measure does not satisfy a similarity threshold requirement, determine that the first TME or a portion of the first TME is currently closed to traffic. In an example embodiment, a TME is a link corresponding to a road segment or a lane corresponding to a travel lane of a road segment.

According to yet another aspect of the present invention, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus, to cause the apparatus to receive a plurality of instances of current probe data. Each instance of current probe data comprises location data indicating a location of a vehicle having a probe apparatus onboard when the instance of current probe data was captured by the probe apparatus. The computer-readable program code portions further comprise executable portions configured, when executed by a processor of an apparatus, to cause the apparatus to identify instances of current probe data from the plurality of instances of current probe data corresponding to a first TME of a current map version based on the location data of the instances of current probe data and the current map version; determine a current traffic measure for the first TME based on the identified instances of current probe data; access historical traffic data corresponding to a second TME of a previous map version that corresponds to the first TME of the current map version, the historical traffic data associated with the previous map version; determine a scaling factor based on current map data corresponding to the first TME from the current map version and previous map data corresponding to the second TME from the previous map version; determine a scaled historical traffic measure for the first TME based on the historical traffic data and the scaling factor; and compare the current traffic measure and the scaled historical traffic measure. The computer-readable program code portions further comprise executable portions configured, when executed by a processor of an apparatus, to cause the apparatus to, responsive to determining that a result of the comparison of the current traffic measure and the scaled historical traffic measure does not satisfy a similarity threshold requirement, generate updated map data corresponding to the first TME.

In an example embodiment, the computer-readable program code portions further comprise executable portions configured, when executed by a processor of an apparatus, to cause the apparatus to provide the updated map data to at least one vehicle apparatus. The at least one vehicle apparatus is configured to perform a navigation function based on the updated map data. In an example embodiment, the updated map data is provided as part of a map tile corresponding to a new map version. In an example embodiment, the current map data comprises a first length of the first TME, the previous map data comprises a second length of the second TME, and the scaling factor is proportional to a ratio of the first length and the second length. In an example embodiment, the current traffic measure is a current volume of traffic and the scaled historical traffic measure is a historical volume of traffic scaled based on the scaling factor. In an example embodiment, the current volume of traffic and the historical volume of traffic are both associated with an epoch. In an example embodiment, the historical traffic data comprises and/or is determined based on historical probe data that has been map-matched to the previous map version. In an example embodiment, the computer-readable program code portions further comprise executable portions configured, when executed by a processor of an apparatus, to cause the apparatus to, responsive to determining that the result of the comparison of the current traffic measure and the scaled historical traffic measure does satisfy a similarity threshold, determine that the current map data corresponding to the first TME is up to date. In an example embodiment, the computer-readable program code portions further comprise executable portions configured, when executed by a processor of an apparatus, to cause the apparatus to, responsive to determining that a result of the comparison of the current traffic measure and the scaled historical traffic measure does not satisfy a similarity threshold requirement, determine that the first TME or a portion of the first TME is currently closed to traffic. In an example embodiment, a TME is a link corresponding to a road segment or a lane corresponding to a travel lane of a road segment.

BRIEF DESCRIPTION OF THE DRAWINGS

Figure 1:
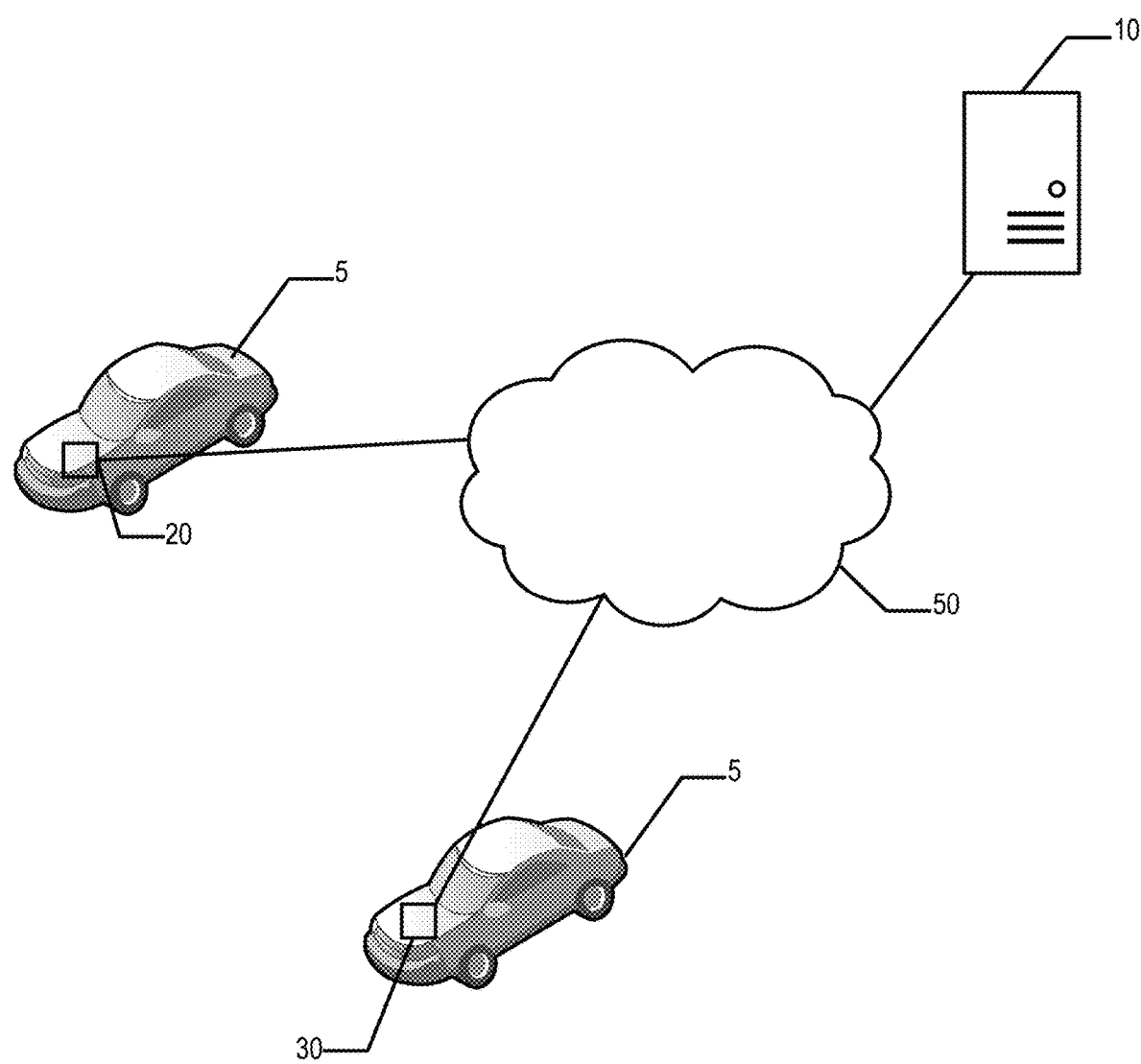
Figure 2A:
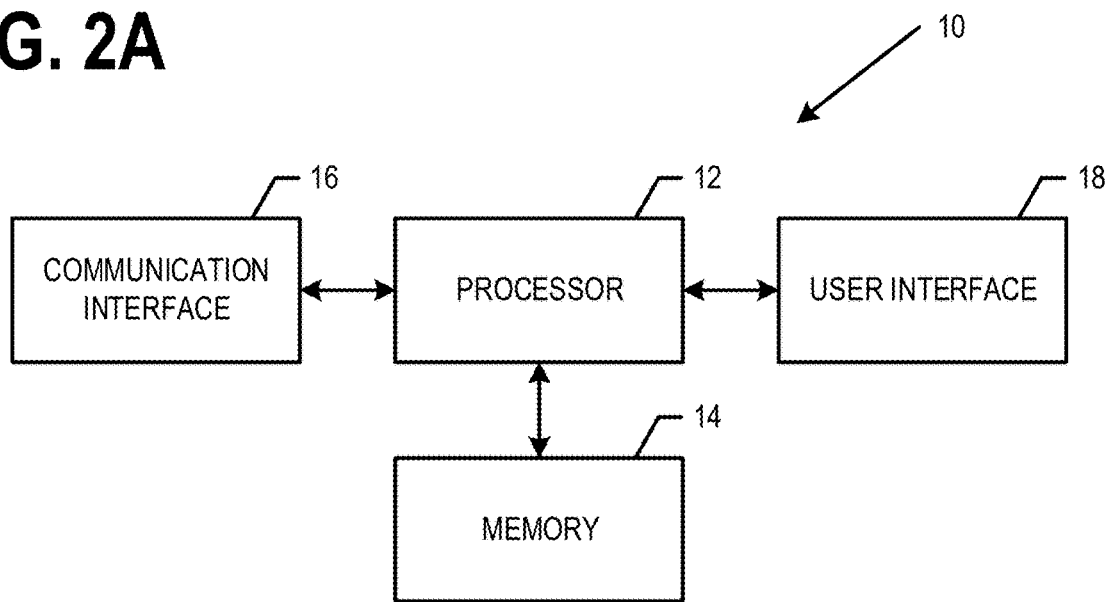
Figure 2B:
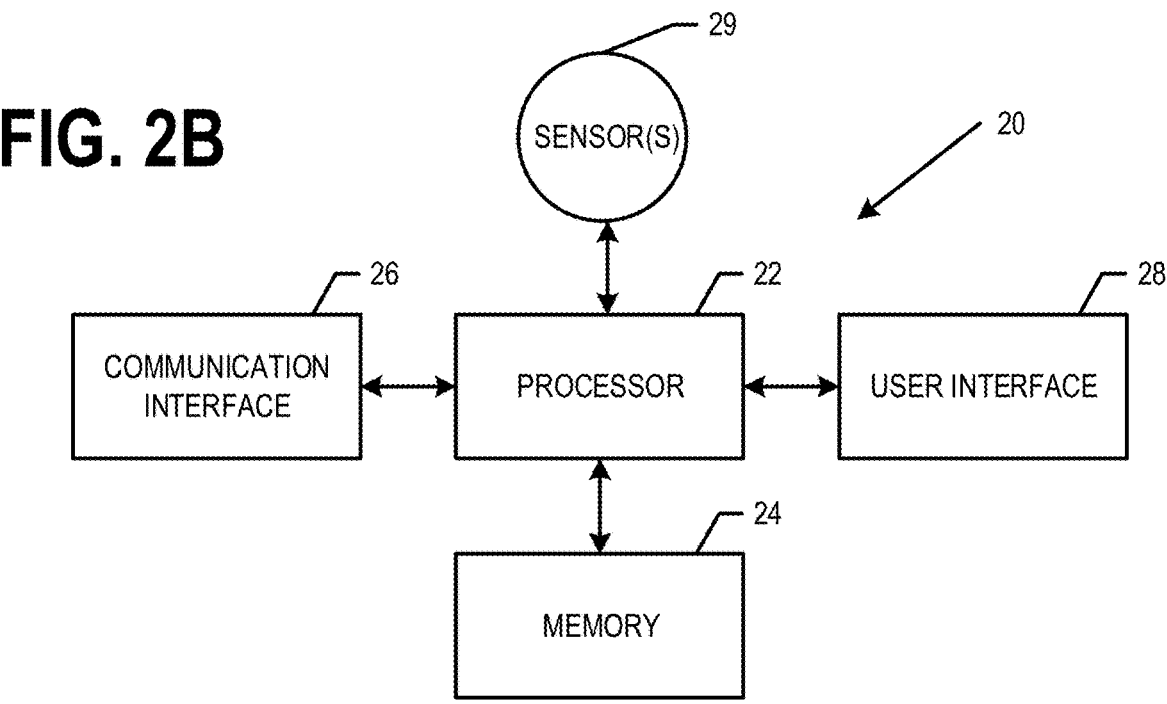
Figure 3:
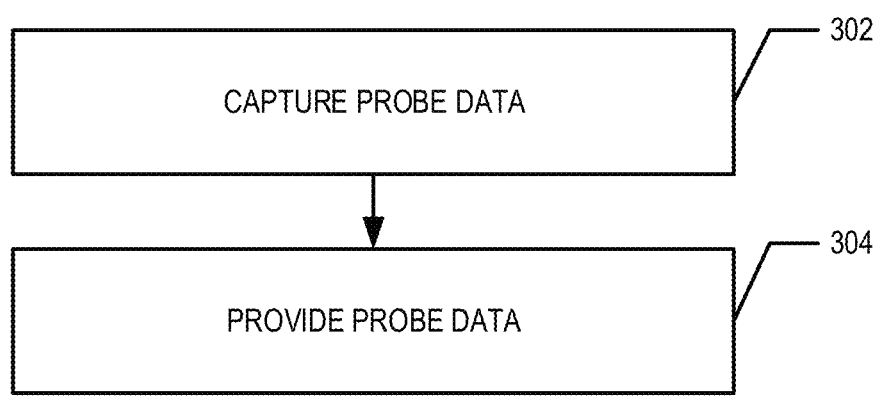
Figure 4A:
Figure 4B:
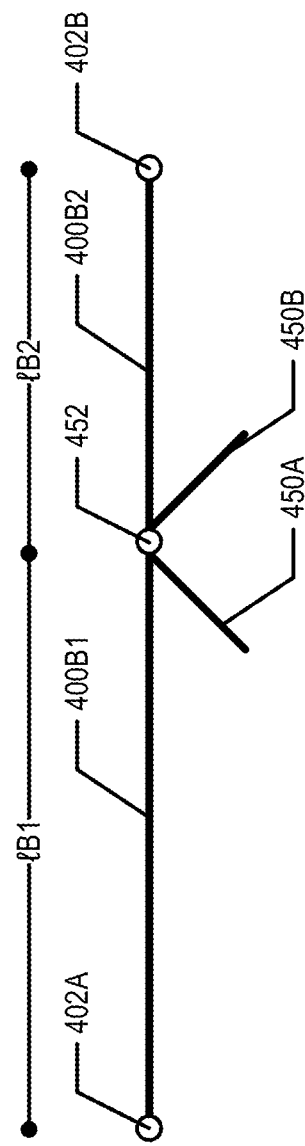
Figure 5:
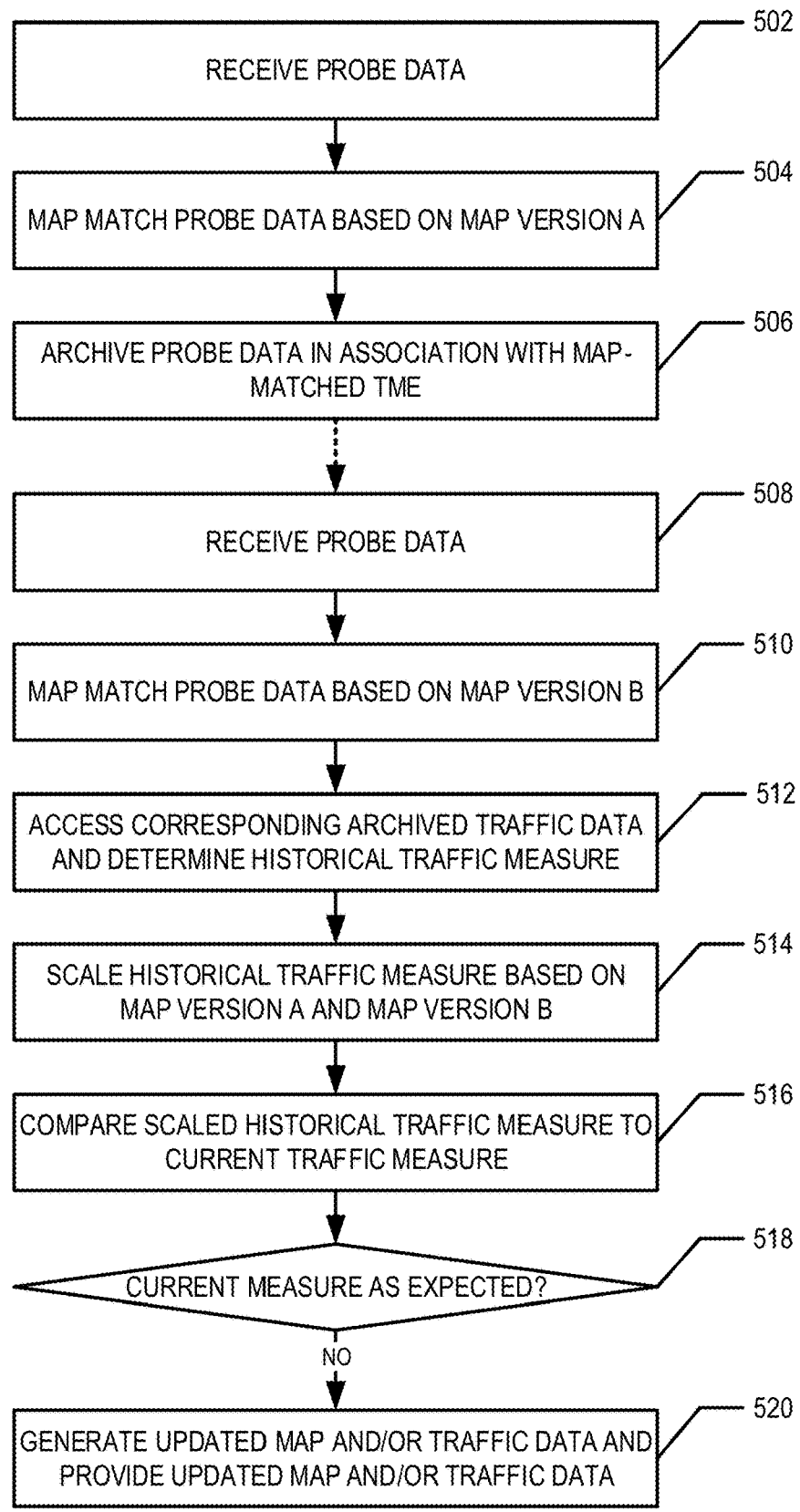
Figure 6:
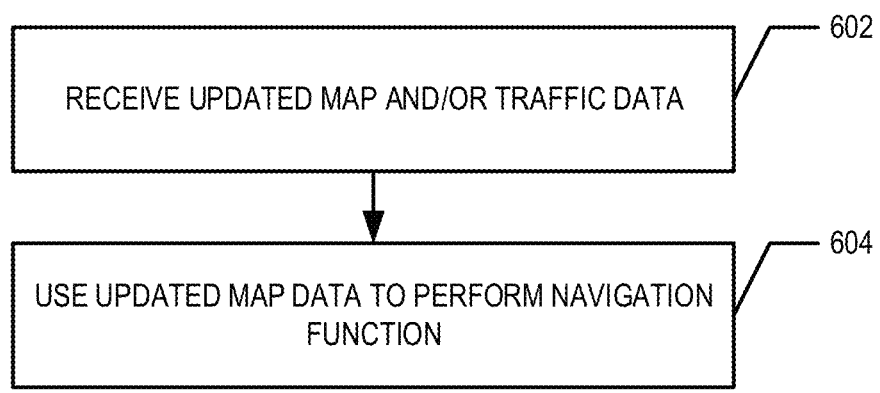

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a network apparatus that may be specifically configured in accordance with an example embodiment;

FIG. 2B is a block diagram of a probe apparatus that may be specifically configured in accordance with an example embodiment;

FIG. 2C is a block diagram of a vehicle apparatus that may be specifically configured in accordance with an example embodiment;

FIG. 3 is a flowchart illustrating operations performed, such as by the probe apparatus of FIG. 2B to provide probe information/data, in accordance with an example embodiment;

FIG. 4A illustrates an example second TME of a previous map version;

FIG. 4B illustrates example first TMEs of a current map version that correspond to the second TME shown in FIG. 4A;

FIG. 5 is a flowchart illustrating operations performed, such as by the network apparatus of FIG. 2A to generate and provide a map update based on archived probe information/data, in accordance with an example embodiment; and FIG. 6 is a flowchart illustrating operations performed, such as by the vehicle apparatus of FIG. 2C, to use the map update to perform a navigation function, in accordance with an example embodiment.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus, and computer program products are provided in accordance with an example embodiment in order to provide a scaled model generated based on historical and/or archived traffic information/data that is associated with a previous map version and that may be used to generate predictions (e.g., scaled historical traffic measures) that can be directly compared to current traffic measures that are determined based on a current map version. The previous map version is a prior map version that was released prior to the release of the current map version. Moreover, the road geometry of at least a first TME according to the current map version is different from the road geometry of a corresponding second TME of the previous map version. In various embodiments, the application of a scaling factor to the historical traffic measures (e.g., to generate the scaled historical traffic measures) corresponding to the first TME prevents the scaled model from generating inaccurate and/or erroneous predictions that may result from the changes in road geometry of the second TME of the previous map version and the first TME of the current map version.

In an example embodiment, the scaled historical traffic measures are determined for a particular epoch that corresponds to the current epoch. In an example embodiment, the scaled historical traffic measures corresponding to a first TME and first epoch include an expected volume of traffic along the first TME during the first epoch and the current traffic measures include a current volume of traffic along the first TME. If the current volume of traffic along the first TME is substantially lower than the expected volume of traffic along the first TME during the first epoch (e.g., the current volume of traffic and the expected volume of traffic do not satisfy a similarity threshold requirement), it may be determined that the first TME is experiencing a complete or partial closure. The determination of whether the first TME is experiencing a partial closure or a complete closure may be determined based on the comparison of the current volume of traffic and the expected volume of traffic, in an example embodiment. If the current volume of traffic along the first TME is substantially greater than the expected volume of traffic along the first TME during the first epoch (e.g., the current volume of traffic and the expected volume of traffic do not satisfy a similarity threshold requirement), it may be determined that a TME in the vicinity of the first TME is experiencing a partial or complete closure and/or that the overall volume of traffic through a portion of the road network is greater than expected based on historical traffic information/data (e.g., there may be a special event causing an increase in traffic volume in the area of the first TME). If the current volume of traffic is substantially the same as the expected volume of traffic along the first TME during the first epoch (e.g., the current volume of traffic and the expected volume of traffic satisfy the similarity threshold requirement), it may be determined that the first TME is experiencing a normal traffic flow and/or that the map information/data corresponding to the first TME in the current map version is up to date.

In various embodiments, probe apparatuses onboard vehicles traveling through at least a portion of a road network may capture instances of probe information/data via one or more sensors onboard the corresponding vehicles. In various embodiments, the probe information/data includes location information/data that indicates a location of the vehicle when the probe information/data was captured. In an example embodiment, the probe information/data may further include a timestamp indicating a date and/or time when the probe information/data was captured, a heading of the vehicle when the probe information/data was captured, a speed with which the vehicle was traveling when the probe information/data was captured, information/data corresponding to the environment about the vehicle, and/or the like. The probe apparatuses may then provide one or more instances of probe information/data (e.g., including location information/data, a timestamp, and/or the like).

A network apparatus may receive a plurality of instances of probe information/data. The network apparatus may be configured to map match each instance of probe information/data to a TME of a digital map representing a road network based on the location information/data of the probe information/data. In particular, the network apparatus may use the location information/data of an instance of probe information/data to map match an instance of probe information/data to a TME of a map version of the digital map that is the current map version at the time when the map matching is being performed (e.g., the most up to date map version at the time when the map matching is performed). In various embodiments, a TME is a link corresponding to a road segment of a road network or a lane corresponding to a travel lane of a road segment of the road network. In various embodiments, a road segment is a length of roadway that is defined by a first intersection or node and a second intersection or node. In an example embodiment, each instance of probe information/data is matched to an epoch based on a timestamp of the instance of probe information/data. An epoch is a predefined period or window of time that may be defined by a date of the year, day of the week, and/or time of day. In an example embodiment, an epoch is a fifteen minute period of time with a defined start and stop date and/or time. The instances of probe information/data may be archived in association with metadata identifying the map version to which the instances of probe information/data was map-matched. In an example embodiment, the instances of probe information/data map-matched to a particular TME and time-matched to a particular epoch are analyzed to determine traffic information/data corresponding to the particular TME and the particular epoch. In an example embodiment, the traffic information/data is stored and/or archived in addition to and/or instead of the instances of probe information/data. In an example embodiment, the traffic information/data may be stored and/or archived in association with metadata comprising a TME identifier configured to identify the particular TME, an epoch identifier configured to identify the particular epoch, a map version identifier configured to identify the map version used to map match the instances of probe information/data that was used to generate the traffic information/data, and/or the like.

In various embodiments, the network apparatus is configured to determine current traffic conditions and/or map information/data based on comparing current traffic measures to historical traffic measures. For example, the network apparatus may analyze instances of current probe information/data to determine current traffic measures for a first TME. For example, the network apparatus may match instances of current probe information/data based on a current map version (e.g., a most up to date map version and/or a most recently released map version) to determine current traffic measures for the first TME. The current map version used to determine the current traffic measures is a different, more recent map version than the previous map version used to determine the historical traffic information/data. For example, the current map version may comprise a first TME that corresponds to a second TME of the previous map version and the road geometry of the first TME may differ from that of the second TME. For example, the road geometry of a particular road segment and/or travel lane may have changed between the release of the previous map version and the release of the current map version. The network apparatus is configured to analyze historical traffic information/data to determine historical traffic measures corresponding to the first TME. A scaling factor is applied to the historical traffic measures. The scaling factor is configured to scale the historical traffic measures based on changes to road geometry corresponding to the difference between the road geometry of the second TME of the previous map version and the corresponding first TME of the current map version.

The network apparatus may then determine if the scaled historical traffic measures corresponding to the first TME and the current traffic measures corresponding to the first TME satisfy a similarity threshold requirement. If it is determined that the similarity threshold requirement is satisfied by the scaled historical traffic measures and the current traffic measures corresponding to the first TME, it is determined that the map information/data corresponding to the first TME is up to date, traffic conditions along the first TME are as expected, and/or the like. If it is determined that the similarity threshold requirement is not satisfied by the scaled historical traffic measures and the current traffic measures corresponding to the first TME, it is determined that the map information/data corresponding to the first TME is not up to date and/or that traffic conditions along the first TME are different from expected. In an example embodiment, the scaled historical traffic measures indicate an expected volume of traffic along the first TME during a particular epoch and the current traffic measure indicates the current volume of traffic along the first TME. In such an embodiment, when the scaled historical traffic measures and the current traffic measures corresponding to the first TME do not satisfy the similarity threshold requirement, it may be determined that the first TME and/or a portion of the TME is closed (e.g., due to construction, an accident, a stalled vehicle, debris on the road, and/or the like). For example, the current volume of traffic along the first TME being less than the expected volume of traffic may be an indication of a complete and/or partial road segment and/or travel lane closure along the first TME. For example, the comparison of the scaled historical traffic measures and the current traffic measures corresponding to the first TME may be used to automatically identify complete and/or partial road segment and/or travel lane closures and/or to automatically verify complete and/or partial road segment and/or travel lane closures corresponding to the first TME.

In various embodiments, in response to determining that the scaled historical traffic measures and the current traffic measures corresponding to the first TME do not satisfy the similarity threshold requirement, the network apparatus may generate updated map information/data corresponding to the first TME. For example, the updated map information/data may indicate that the first TME is experiencing a partial or complete closure. For example, the updated map information/data may indicate that the first TME is experiencing traffic conditions that differ from the traffic conditions expected along the first TME, and/or the like. In an example embodiment, the updated map information/data may include information/data regarding current traffic conditions along the first TME. The network apparatus may provide the updated map information/data to at least one vehicle apparatus. In an example embodiment, the network apparatus provides the updated map information/data as part of a map tile of a digital map and/or as part of a digital map. For example, the updated map information/data may be provided as part of a data record corresponding to the first TME and stored in a geographic database of a digital map. For example, the map tile of the digital map may provide a representation of the road network (e.g., in the form of a geographic database) in a geographical area comprising the road segment and/or travel lane of the road segment corresponding to the first TME. In various embodiments, the network apparatus may provide the updated map information/data and/or digital map and/or digital map tile comprising the updated map information/data such that one or more vehicle apparatuses receive the updated map information/data, digital map, and/or digital map tile and use at least a portion of the updated map information/data for performing one or more navigation functions.

In various embodiments, a vehicle apparatus is onboard a vehicle. In various embodiments, a vehicle apparatus may receive updated map information/data or a digital map and/or digital map tile(s) comprising updated map information/data. The vehicle apparatus may then use at least a portion of the updated map information/data to perform one or more navigation functions. Some non-limiting examples of navigation functions include localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, provision of safety alerts, and/or the like. For example, in an example embodiment, a vehicle apparatus may modify a route to avoid a first TME that is experiencing a complete and/or partial closure according to the updated map information/data.

FIG. 1 provides an illustration of an example system that can be used in conjunction with various embodiments of the present invention. As shown in FIG. 1, the system may include one or more network apparatuses 10, one or more probe apparatuses 20, wherein each probe apparatus 20 is disposed in or on a vehicle 5, one or more vehicle apparatuses 30, wherein each vehicle apparatus 30 is disposed in or on a vehicle 5, one or more networks 50, and/or the like. In various embodiments, the probe apparatus 20 and/or vehicle apparatus 30 may be an in vehicle navigation system, vehicle control system, a mobile computing device, a mobile data gathering platform, and/or the like. For example, a probe apparatus 20 and/or vehicle apparatus 30 may be an in vehicle navigation system mounted within and/or be onboard a vehicle 5 such as a motor vehicle, non-motor vehicle, automobile, car, scooter, truck, van, bus, motorcycle, bicycle, Segway, golf cart, and/or the like. In an example embodiment, the probe apparatus 20 and/or vehicle apparatus 30 may be a vehicle control system configured to autonomously drive a vehicle 5, assist in control of a vehicle 5, monitor various aspects of the vehicle 5 (e.g., fault conditions, motor oil status, battery charge level, fuel tank fill level, and/or the like) and/or the like. In various embodiments, the probe apparatus 20 and/or vehicle apparatus 30 that is configured to autonomously drive a vehicle 5 may perform multiple functions that are similar to those performed by a probe apparatus 20 and/or vehicle apparatus 30 configured to be an ADAS (e.g., lane keeping, lane change assistance, maintaining a lane, merging, etc.). In some embodiments, a probe apparatus 20 and/or vehicle apparatus 30 may be onboard a personal vehicle, commercial vehicle, public transportation vehicle, fleet vehicle, and/or other vehicle. In various embodiments, the probe apparatus 20 and/or vehicle apparatus 30 may be a smartphone, tablet, personal digital assistant (PDA), personal computer, desktop computer, laptop, and/or other mobile computing device. In an example embodiment, the probe apparatus 20 is onboard fleet vehicles and comprises a mobile data gathering platform. In an example embodiment, a vehicle apparatus 30 is onboard a vehicle 5 and is used to perform one or more navigation functions corresponding to the vehicle 5 traversing at least a portion of a road network. In an example embodiment, the network apparatus 10 is a server, group of servers, distributed computing system, and/or other computing system. In an example embodiment, the network apparatus 10 is not located onboard a vehicle. For example, the network apparatus 10 may be in communication with one or more probe apparatuses 20, one or more vehicle apparatuses 30, and/or the like via one or more wired or wireless networks 50.

In an example embodiment, a network apparatus 10 may comprise components similar to those shown in the example network apparatus 10 diagrammed in FIG. 2A. In an example embodiment, the network apparatus 10 is configured to receive instances of probe information/data generated and provided by one or more probe apparatuses 20, generate current traffic measures and scaled historical traffic measures for one or more TMEs, determine if the map information/data corresponding to one or more TMEs is up to date or needs to be updated based on a comparison of the current traffic measures and the scaled historical traffic measures for the one or more TMEs, and provide updated map information/data such that at least one vehicle apparatus 30 receives the updated map information/data, and/or the like. For example, as shown in FIG. 2A, the network apparatus 10 may comprise a processor 12, memory 14, a user interface 18, a communications interface 16, and/or other components configured to perform various operations, procedures, functions or the like described herein. In at least some example embodiments, the memory 14 is non-transitory.

In an example embodiment, a probe apparatus 20 is onboard a vehicle 5. In an example embodiment, the probe apparatus 20 may be configured to capture instances of probe information/data via one or more sensors onboard the vehicle 5 and provide instances of probe information/data such that a network apparatus 10 receives the probe information/data. In various embodiments, an instance of probe information/data comprises location information/data indicating a location of the vehicle 5 when the instance of probe information/data was captured. In various embodiments, an instance of probe information/data may further comprise a timestamp indicating a date and/or time that the instance of probe information/data was captured, a heading of the vehicle 5 when the instance of probe information/data was captured, a travel speed of the vehicle at the time when the probe information/data was captured, information/data corresponding to the environment about the vehicle 5 when the instance of probe information/data was captured, and/or the like. In an example embodiment, the probe apparatus 20 is configured to determine location information/data indicating a location (e.g., geolocation such as latitude and longitude and/or the like) of the vehicle 5 and/or probe apparatus 20 when the corresponding instance of probe information/data was captured. In an example embodiment, the probe apparatus 20 is configured to determine a timestamp indicating the date and/or time that the instance of probe information/data was captured.

In an example embodiment, as shown in FIG. 2B, the probe apparatus 20 may comprise a processor 22, memory 24, a communications interface 26, a user interface 28, one or more sensors 29 (e.g., a location sensor such as a global navigation satellite system (GNSS) sensor; inertial measurement unit (IMU) sensors; camera(s); image sensors; two dimensional (2D) and/or three dimensional (3D) light detection and ranging (LiDAR)(s) sensors; long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the probe apparatus 20 to determine one or more features of the corresponding vehicle's 5 surroundings and/or monitor the vehicle's 5 operating parameters), and/or other components configured to perform various operations, procedures, functions or the like described herein. In at least some example embodiments, the memory 24 is non-transitory.

In an example embodiment, a vehicle apparatus 30 is onboard a vehicle 5. In an example embodiment, the vehicle apparatus 30 may be configured to receive updated map information/data (e.g., possibly as part of a digital map and/or one or more digital map tiles) and use at least a portion of the updated map information/data to perform one or more navigation functions. In an example embodiment, as shown in FIG. 2C, the vehicle apparatus 30 may comprise a processor 32, memory 34, a communications interface 36, a user interface 38, one or more sensors 39 (e.g., a location sensor such as a GNSS sensor; IMU sensors; camera(s); image sensors; two dimensional (2D) and/or three dimensional (3D) light detection and ranging (LiDAR)(s) sensors; long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the vehicle apparatus 30 to determine one or more features of the corresponding vehicle's 5 surroundings and/or monitor the vehicle's 5 operating parameters), and/or other components configured to perform various operations, procedures, functions or the like described herein. In at least some example embodiments, the memory 34 is non-transitory.

Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In some embodiments, a network 50 may comprise the automotive cloud, digital transportation infrastructure (DTI), radio data system (RDS)/high definition (HD) radio or other digital radio system, and/or the like. For example, a probe apparatus 20 and/or vehicle apparatus 30 may be in communication with a network apparatus 10 via the network 50. For example, a probe apparatus 20 and/or vehicle apparatus 30 may communicate with the network apparatus 10 via a network, such as the Cloud. For example, the Cloud may be a computer network that provides shared computer processing resources and data to computers and other devices connected thereto. For example, the probe apparatus 20 may be configured to provide one or more instances of probe information/data via the network 50. For example, the network apparatus 10 may be configured to receive a plurality of instances of probe information/data and provide updated map information/data and/or digital maps and/or digital maps tiles comprising updated map information/data via the network 50. For example, a vehicle apparatus 30 may be configured to receive updated map information/data and/or digital maps and/or digital maps tiles comprising updated map information/data via the network 50.

Certain example embodiments of the network apparatus 10, probe apparatus 20, and/or vehicle apparatus 30 are described in more detail below with respect to FIGS. 2A, 2B, and 2C.

II. Example Operation

Example embodiments provide methods, apparatus, systems, computer program products, and/or the like for adjusting or scaling historical traffic information/data for use in real time processing of current instances of probe information/data and determination of real time traffic conditions, map information/data, and/or the like. For example, methods, apparatus, and computer program products are provided in accordance with an example embodiment in order to provide a scaled model generated based on historical and/or archived traffic information/data that is associated with a previous map version and that may be used to generate predictions (e.g., scaled historical traffic measures) that can be directly compared to current traffic measures that are determined based on a current map version. The previous map version is a prior map version that was released prior to the release of the current map version. Moreover, the road geometry of at least a first TME according to the current map version is different from the road geometry of a corresponding second TME of the previous map version. In various embodiments, the application of a scaling factor to the historical traffic measures (e.g., to generate the scaled historical traffic measures) corresponding to the first TME prevents the scaled model from generating inaccurate and/or erroneous predictions that may result from the changes in road geometry of the first TME between the release of the previous map version and the release of the current map version. Various features of some example embodiments will now be described in more detail.

a. Example Operation of a Probe Apparatus

In various embodiments, a probe apparatus 20 is onboard a vehicle 5 that is traversing at least a portion of a road network. In various embodiments, one or more sensors 29 are onboard the vehicle 5 and are in communication with the probe apparatus 20. In an example embodiment, the road network is represented by a digital map (e.g., possibly in the form of a geographic database). In various embodiments, the probe apparatus 20 captures instances of probe information/data via the one or more sensors 29 as the vehicle 5 traverses the at least a portion of the road network. In an example embodiment, the probe apparatus 20 may capture instances of probe information/data periodically based on time (e.g., every second, every ten seconds, every thirty seconds, every minute, and/or the like) and/or distance traveled (e.g., every meter, ten meters, fifty meters, hundred meters, 250 meters, and/or the like). The probe apparatus 20 may be configured to provide one or more instances of probe information/data via a network 50 such that a network apparatus 10 receives the one or more instances of probe information/data.

FIG. 3 provides a flowchart illustrating operations performed, such as by the probe apparatus 20 of FIG. 2B to provide one or more instances of probe information/data. Starting at block 302, an instance of probe information/data is captured. For example, as the vehicle 5 traverses at least a portion of the road network, one or more sensors 29 may capture sensor information/data and communicate the sensor information/data to the probe apparatus 20. For example, the probe apparatus 20 may capture sensor information/data. For example, the probe apparatus 20 may comprise means, such as the processor 22, memory 24, sensors 29, and/or the like, for capturing sensor information/data. In various embodiments, the sensor information/data describes at least a portion of the environment surrounding the vehicle 5. For example, the sensor information/data may comprise GNSS information/data, digital images, lidar point clouds, radar point clouds, ultrasonic information/data, electromagnetic information/data, thermal information/data, and/or the like. In various embodiments, the probe apparatus 20 may concurrently determine location information/data indicating a location of the vehicle 5 and/or the probe apparatus 20 when the sensor information/data was captured and a timestamp corresponding to the date and/or time at which the sensor information/data was captured. For example, the vehicle apparatus 20 may determine location information/data for the vehicle 5 and/or the probe apparatus 20 based on GNSS information/data, IMU sensor information/data, visual odometry (e.g., based on one or more digital images), and/or other localization techniques and/or a combination thereof. In various embodiments, the probe apparatus 20 comprises and/or is communication with an apparatus comprising a clock such that the probe apparatus 20 may determine a timestamp corresponding to the date and/or time at which the sensor information/data is captured. In various embodiments, the instance of probe information/data comprises the location information/data. In various embodiments, the instance of probe information/data comprises the timestamp, a vehicle apparatus identifier configured to identify the vehicle apparatus generating the instance of probe information/data, a speed of the vehicle 5 at the date and/or time indicated by the timestamp, one or more other elements of the sensor information/data, and/or the like.

At block 304, the instance of probe information/data is provided. For example, the probe apparatus 20 may provide the instance of probe information/data such that a network apparatus 10 receives the instance of probe information/data. For example, the probe apparatus 20 may comprise means, such as processor 22, memory 24, communications interface 26, and/or the like, for providing an instance of probe information/data such that the network apparatus 10 receives the instance of probe information/data. In various embodiments, a sensor quality communication is a communication comprising one or more sensor quality metrics, a sensor indentification (ID) identifying a sensor type corresponding to each sensor quality metric, a location and timestamp indicating the location and date and/or time at which the sensor information/data used to determine the sensor quality metric was captured, and/or the like. For example, the probe apparatus may repeatedly, such as regularly and/or periodically (e.g., based on a time and/or travel distance trigger), provide one or more sensor quality communications.

b. Example Operation of a Network Apparatus

In various embodiments, a network apparatus 10 may be configured to receive a plurality of instances of probe information/data. The network apparatus 10 may map match each instance of probe information/data of the plurality of instances of probe information/data received. Each instance of probe information/data is map-matched based on the map version (e.g., version of a digital map) that is the current map version at the time the instance of probe information/data is being map-matched. For example, at time TA, the current map version is version A and at time TB, the current map version is version B. As used herein version A is a first version of a digital map and version B is a second version of the digital map. The first and second version need not be sequential—meaning one or more versions of the digital map may be released between the release of the first version (e.g., version A) and the release of the second version (e.g., version B). An instance of probe information/data map-matched at time TA is map-matched based on version A of the digital map and an instance of probe information/data map-matched at time TB is map-matched based on version B of the digital map. Between the release of version A of the digital map and the release of version B of the digital map, the road geometry of a road segment and/or travel lane may be changed. For example, version A of the digital map may comprise map information/data for a second TME and version B of the digital map may comprise map information/data for a first TME, where the second TME corresponds to the first TME but has an at least partially different road geometry. For example, FIG. 4A illustrates a portion of a road network at time TA comprising a second TME 400. For example, the second TME 400 may be a segment of a highway and starting point or node 402A may be a first highway exit and ending point or node 402B may be a second exit. The second TME 400 is defined by starting point or node 402A and ending point or node 402B. The second TME 400 defines a length $l_A$. For example, the distance between the starting point or node 402A and the ending point or node 402B along the second TME 400 is length $l_A$. FIG. 4B illustrates the same portion of the road network at time TB. During the time between when version A of the digital map was released and when version B of the digital map was released, an intermediate exit (e.g., intermediate point or node 452) has been added between the starting point or node 402A and the ending point or node 402B. For example, entrance and exit ramps 452A and 452B may have been built, opened, and/or the like. Thus, second TME 400 from version A of the digital map corresponds to two first TMEs (e.g., 400B1 and 400B2) of version B of the digital map. As used herein, second TME 400 from version A of the digital map corresponds to first TME 400B1 and first TME 400B2 from version B of the digital map because second TME 400 and first TME 400B1 overlap at least in part and second TME 400 and first TME 400B2 overlap at least in part. For example, second TME 400 and first TME 400B1 share a defining node (e.g., starting point or node 402A) and overlap at least in part; thus second TME 400 corresponds to first TME 400B1. Similarly, second TME 400 and first TME 400B2 share a defining node (e.g., ending point or node 402B) and overlap at last in part; thus second TME 400 corresponds to first TME 400B2. As shown in FIG. 4B, the first TME 400B1 defines a length $l_{B1}$ and the first TME 400B2 defines a length $l_{B2}$. For example, the distance between starting point or node 402A and intermediate point or node 452 is length $l_{B1}$ and the distance between intermediate point or node 452 and ending point or node 402B is length $l_{B2}$. In general, the sum of lengths of first TME 400B1 and first TME 400B2 is approximately the length of second TME 400 (e.g., $l_{B1}+l_{B2}=l_A$). In an example embodiment, to determine expected traffic measures for first TME 400B1, historical traffic information/data corresponding to second TME 400 may be used. Similarly, to determine expected traffic measures for first TME 400B2, historical traffic information/data corresponding to second TME 400 may be used. However, in practice, it is found that blindly applying predications generated based on the historical traffic information/data corresponding to second TME 400 to first TME 400B1 and/or first TME 400B2 may result in inaccurate and/or erroneous predictions. For example, in situations where intersection layout changes, an intersection is removed (e.g., a new overpass is built), a tunell is replaced with an overpass, portions of TMEs are temporarily and/or permanently closed, and/or the like, blindly applying predictions based on historical traffic information/data data corresponding to second TME 400 to first TME 400B1 and/or first TME 400B2 may result in inaccurate and/or erroneous predictions. Various embodiments of the present invention provide a technical solution to this technical problem such that the historical traffic information/data corresponding to second TME 400 may be used to generate accurate predictions for use in determining current traffic conditions (e.g., partial or complete closures) of first TME 400B1 and/or first TME 400B2.

FIG. 5 provides a flowchart illustrating operations performed, such as by the network apparatus 10 to determine current traffic conditions corresponding to a first TME and, when appropriate, generate and provide updated map information/data corresponding to the first TME, in accordance with an example embodiment. Blocks 502-506 are performed at some time or period of time prior to blocks 508-520. For example, to continue with the example of FIGS. 4A and 4B, blocks 502-506 may occur at time TA and block 508-520 may occur at time TB.

Starting at block 502, a plurality of instances of probe information/data are received. For example, the network apparatus 10 may receive a plurality of instances of probe information/data provided by one or more probe apparatuses 20. For example, a network apparatus 10 may comprise means, such as processor 12, memory 14, communications interface 16, and/or the like, for receiving a plurality of instances of probe information/data. In various embodiments, an instance of probe information/data comprises location information/data indicating a location of the vehicle 5 when the instance of probe information/data was captured. In various embodiments, an instance of probe information/data may further comprise a timestamp indicating a date and/or time that the instance of probe information/data was captured, a heading of the vehicle 5 when the instance of probe information/data was captured, a travel speed of the vehicle at the time when the instance of probe information/data was captured, information/data corresponding to the environment about the vehicle 5 (e.g., sensor information/data) when the instance of probe information/data was captured, and/or the like.

At block 504, each of the plurality of instances of probe information/data is map-matched based on (a) the location information/data of the instance of probe information/data and (b) the version of the digital map that is the current version of the digital map at the time the map matching is being performed. For example, the network apparatus 10 may map match each of the plurality of instances of probe information/data based on (a) the location information/data of the instance of probe information/data and (b) the version of the digital map that is the current version of the digital map at the time the map matching is being performed. For example, the network apparatus comprises means, such as processor 12, memory 14, and/or the like, for map matching each of the plurality of instances of probe information/data based on (a) the location information/data of the instance of probe information/data and (b) the version of the digital map that is the current version of the digital map at the time the map matching is being performed. For example, a TME along which the vehicle 5 was traveling when the probe apparatus 20 captured the instance of probe information/data may be determined based on (a) the location information/data of the instance of probe information/data and (b) the version of the digital map that is the current version of the digital map at the time the map matching is being performed. For example, continuing with the example shown in FIGS. 4A and 4B, one or more instances of probe information/data may be map-matched to second TME 400 based on the corresponding location information/data and version A of the digital map (when the map-matching of the one or more instances of probe information/data are performed at time TA).

In an example embodiment, each instance of probe information/data may be time-matched to an epoch. An epoch is a predefined period or window of time that may be defined by a date of the year, day of the week, and/or time of day. In an example embodiment, an epoch is a fifteen minute period of time with a defined start and stop date and/or time. For example, in various embodiments, an epoch may be a time window of a day, week, or year of a predetermined time length. For example, an instance of probe information/data may be time-matched to an epoch based on a set of predefined epochs and the timestamp of the instance of probe information/data. For example, the network apparatus 10 may time match each instance of probe information/data based on a time stamp of the instance of probe information/data and a set of predefined epochs. For example, the network apparatus 10 may comprise means, such as processor 12, memory 14, and/or the like, for time matching each instance of probe information/data based on a time stamp of the instance of probe information/data and a set of predefined epochs.

At block 506, the map-matched probe information/data may be archived. For example, the network apparatus 10 may archive the map-matched probe information/data. For example, the network apparatus 10 may comprise means, such as the processor 12, memory 14, and/or the like, for archiving the map-matched probe information/data. In an example embodiment, each instance of probe information/data is archived in association with metadata. In an example embodiment, the metadata comprises a TME identifier identifying the TME to which the instance of probe information/data was map-matched, an epoch identifier identifying the epoch to which the instance of probe information/data was time-matched, a map version identifier identifying the version of the digital map that was used to map-match the instance of probe information/data, and/or the like.

In an example embodiment, the instances of probe information/data map-matched to a TME and/or time-matched to an epoch may be analyzed to generate traffic information/data corresponding to the TME and/or the epoch. For example, the network apparatus 10 may analyze the instances of probe information/data map-matched to a TME and/or time-matched to an epoch to generate traffic information/data corresponding to the TME and/or epoch. For example, the network apparatus 10 may comprise means, such as processor 12, memory 14, and/or the like for analyzing the instances of probe information/data map-matched to a TME and/or time-matched to an epoch to generate traffic information/data corresponding to the TME and/or epoch. In an example embodiment, the traffic information/data may be archived instead of and/or in addition to the instances of probe information/data used to determine the traffic information/data corresponding to the TME and/or epoch. In various embodiments, the traffic information/data is archived in association with metadata. In an example embodiment, the metadata comprises a TME identifier identifying the TME corresponding to/associated with the traffic information/data, an epoch identifier identifying the epoch corresponding to/associated with the traffic information/data, a map version identifier identifying the version of the digital map that was used to map-match the instance of probe information/data, and/or the like.

As should be understood instances of probe information/data and/or traffic information/data corresponding to a plurality of map versions may be archived. For example, a first plurality of instances of probe information/data and/or first traffic information/data corresponding to version A1 of the digital map may be archived and a second plurality of instances of probe information/data and/or second traffic information/data corresponding to version A2 of the digital map may be archived. Similarly, a third plurality of instances of probe information/data and/or third traffic information/data corresponding to version A3 of the digital map may be archived and so on. In various embodiments, the predictions (e.g., historical traffic measures) generated based on one or more of the first plurality, second plurality, third plurality and/or the like of instances of probe information/data and/or first, second, third, and/or the like traffic information/data may be used to generate a traffic measure. These traffic measures may then be combined to generate the historical traffic measures described below. In various embodiments, a scale factor may be applied to each traffic measure prior to the multiple traffic measures being combined to generate the historical traffic measures. The scale factor applied to each traffic measure is determined based on (a) the map version corresponding to the plurality of instances of probe information/data and/or traffic information/data used to generate the traffic measure and (b) the current map version when the historical traffic measures are being determined.

At a later point in time (e.g., at time TB), the archived (now historical) instances of probe information/data and/or traffic information/data are used in the real time (or near real time) processing of current probe information/data. For example, the archived (now historical) instances of probe information/data and/or traffic information/data may be used to generate predictions regarding expected values of traffic measures at the current time. For example, archived (now historical) instances of probe information/data and/or traffic information/data for a second TME (of a previous map version) that corresponds to a first TME (of the current map version) and a first epoch may be used to generate predictions regarding expected values of traffic measures for the first TME at the current time (which corresponds to the first epoch).

At block 508, a plurality of instances of current probe information/data are received. For example, the network apparatus 10 may receive a plurality of instances of current probe information/data provided by one or more probe apparatuses 20. For example, a network apparatus 10 may comprise means, such as processor 12, memory 14, communications interface 16, and/or the like, for receiving a plurality of instances of current probe information/data. In various embodiments, an instance of current probe information/data comprises location information/data indicating a location of the vehicle 5 when the instance of current probe information/data was captured. In various embodiments, an instance of probe information/data may further comprise a timestamp indicating a date and/or time that the instance of current probe information/data was captured, a heading of the vehicle 5 when the instance of current probe information/data was captured, a travel speed of the vehicle at the time when the instance of current probe information/data was captured, information/data corresponding to the environment about the vehicle 5 (e.g., sensor information/data) when the instance of current probe information/data was captured, and/or the like.

At block 510, each of the plurality of instances of current probe information/data are map-matched based on the version of the digital map that is the current map version (e.g., the most recently released map version, most up to date map version, and/or the like) at the time the map matching is being performed. To continue with the example of FIGS. 4A and 4B, the map matching of each of the plurality of instances of current probe information/data is being performed at time TB when version B is the current map version. For example, the network apparatus 10 may map match each of the plurality of instances of current probe information/data based on (a) the location information/data of the instance of current probe information/data and (b) the current version of the digital map (e.g., version B). For example, the network apparatus comprises means, such as processor 12, memory 14, and/or the like, for map matching each of the plurality of current instances of probe information/data based on (a) the location information/data of the instance of current probe information/data and (b) the current version of the digital map (e.g., version B). For example, a TME along which the vehicle 5 was traveling when the probe apparatus 20 captured the instance of current probe information/data may be determined based on (a) the location information/data of the instance of current probe information/data and (b) the current version of the digital map (e.g., version B). In an example embodiment, the network apparatus 10 may further identify a current epoch. For example, a current epoch may be the epoch corresponding to the current time period and/or the time period corresponding to the instances of current probe information/data (e.g., time TB).

At block 512, archived and/or historical instances of probe information/data and/or archived and/or historical traffic information/data is accessed and historical traffic measures are determined. For example, archived and/or historical instances of probe information/data and/or archived and/or historical traffic information/data corresponding to (a) a second TME of a previous map version that corresponds to a first TME and/or (b) a first epoch may be accessed. Historical traffic measures corresponding to the first TME and the first epoch may then be determined based on the accessed archived and/or historical instances of probe information/data and/or archived and/or historical traffic information/data corresponding to (a) the second TME of the previous map version that corresponds to the first TME and/or (b) the first epoch. For example, the network apparatus 10 may access archived and/or historical instances of probe information/data and/or archived and/or historical traffic information/data that are associated with a second TME of a previous map version that corresponds to a first TME and a first epoch and determine historical traffic measures for the second TME of the previous map version and/or for the first epoch based thereon. For example, the network apparatus 10 may comprise means, such as processor 12, memory 14, and/or the like, for accessing archived and/or historical instances of probe information/data and/or archived and/or historical traffic information/data associated with a second TME of a previous map version that corresponds to the first TME and/or the first epoch and for determining historical traffic measures for the first TME and/or the first epoch based on the accessed archived and/or historical information/data. In an example embodiment, the historical traffic measures comprise a historical volume $V_H$ of traffic along the second TME of the previous map version that corresponds to the first TME and during the first epoch. For example, the archived and/or historical instances of probe information/data map-matched to second TME 400 at time TA based on version A of the digital map and/or archived and/or historical traffic information/data corresponding to the second TME 400 may be used to determine a historical traffic measure, that after appropriate scaling, will provide an expected traffic measure for first TME 400B1 and/or first TME 400B2 during a time period corresponding to the first epoch.

At block 514, the historical traffic measure is scaled by applying a scaling factor thereto. For example, a scaling factor may be determined based on one or more characteristics of the second TME of the previous map version that corresponds to the first TME (e.g., as provided by a data record for the second TME in the previous map version) and one or more characteristics of the first TME in the current map version (e.g., as provided by a data record for the first TME in the current map version). For example, when the first TME is TME 400B1, the previous map version is version A, and the current map version is version B, a scaling factor may be determined based on previous map information/data from version A corresponding to second TME 400 and current map information/data from version B corresponding to first TME 400B1. In an example embodiment, the scaling factor may be a ratio of the length of a second TME from the previous map version that corresponds to the first TME and the length of the first TME in the current map version. For example, in an example embodiment, the scaling factor f (when the first TME is TME 400B1, at time TB when version B is the current map version, and the previous map version is version A) may be determined as $f=l_{B1}/l_A$. In an example embodiment, the scaling factor f may be a ratio of the natural logarithm of the length of a second TME from the previous map version that corresponds to the first TME and the natural logarithm of the length of the first TME in the current map version. For example, in an example embodiment, the scaling factor (when the first TME is TME 400B1, at time TB when version B is the current map version, and the previous map version is version A) may be $f=\ln(l_{B1})-\ln(l_A)$. In various embodiments, various other scaling relationships between characteristics of a second TME in a previous map version that corresponds to the first TME and characteristics of the first TME in the current map version may be used to determine a scaling factor f. For example, previous map information/data from a previous map version may be accessed to identify one or more characteristics of a second TME in the previous map version that corresponds to the first TME in the current map version. Similarly, current map information/data from the current map version may be accessed to identify one or more characteristics of the first TME in the current map version. The scaling factor f may then be determined based on the characteristic(s) of the second TME in the previous map version and the characteristic(s) of the first TME in the current map version. For example, the scaling factor f may be a ratio of the characteristics, a difference of the characteristics, and/or other function of the characteristics. In an example embodiment, the characteristics are lengths of the TMEs (e.g., length of the second TME according to previous map information/data of the previous map version and length of the first TME according to current map information/data of the current map version) and the scaling factor f is a ratio of the length of the first TME to the length of the second TME of the previous map version.

In various embodiments, a scaled historical traffic measure is determined by applying a scaling factor to a corresponding historical traffic measure. For example, the scaled historical traffic measure corresponding to a first TME may be determined by applying a scaling factor f to the historical traffic measure determined based on archived and/or historical traffic information/data associated with a second TME of a previous map version that corresponds to the first TME of the current map version. In various embodiments, the application of the scaling factor f may take various forms depending on the historical measure, the scaling factor, and/or the like. For example, in an example embodiment, the scaled historical traffic measure may be determined by multiplying the historical traffic measure by the scaling factor. For example, if the historical traffic measure is a volume $V_H$ along a second TME of a previous map version that corresponds (e.g., overlaps at least in part and/or shares an ending point or node) with the first TME, the scaled historical traffic measure may be determined by $fV_H$, where the scaling factor f is a ratio of the length of the first TME to the length of the TME of the previous map version. For example, a network apparatus 10 may scale a historical traffic measure by applying a scaling factor to the historical traffic measure, wherein the scaling factor is determined based on map information/data from the previous map version (e.g., version A) and map information/data from the current map version (e.g., version B). For example, the network apparatus 10 may comprise means, such as processor 12, memory 14, and/or the like, for scaling a historical traffic measure by applying a scaling factor to the historical traffic measure, wherein the scaling factor is determined based on map information/data from the previous map version (e.g., version A) and map information/data from the current map version (e.g., version B).

At block 516, the scaled historical traffic measure is compared to a current traffic measure. For example, a current traffic measure may be determined for the first TME (and possibly corresponding to a first epoch) based on the instances of current probe information/data that are map-matched to the first TME (e.g., based on the current map version). For example, the scaled historical traffic measure is a predicted value of a traffic measure and the current traffic measure is a measured value. The predicted value (e.g., the scaled historical traffic measure) and the measured value (e.g., the current traffic measure) may be compared to determine if the measured value is in agreement with the predicted value. For example, it may be determined if the scaled historical traffic measure and the current traffic measure satisfy a similarity threshold requirement. For example, the network apparatus 10 may compare the scaled historical traffic measure and the current traffic measure to determine if the scaled historical traffic measure and the current traffic measure satisfy a similarity threshold requirement. For example, the network apparatus 10 may comprise means, such as processor 12, memory 14, and/or the like, for comparing the scaled historical traffic measure and the current traffic measure to determine if the scaled historical traffic measure and the current traffic measure satisfy a similarity threshold requirement. In various embodiments, the scaled historical traffic measure and the current traffic measure may be compared by determining a difference between the scaled historical traffic measure and the current traffic measure, taking a ratio of the scaled historical traffic measure and the current traffic measure, and/or the like.

In various embodiments, the similarity threshold requirement may comprise a similarity threshold value or range. In an example embodiment, the similarity threshold value may be a predetermined value or range. For example, in an example embodiment, the scaled historical traffic measure and the current traffic measure satisfy the similarity threshold requirement when a ratio of the scaled historical traffic measure and the current traffic measure is within the predetermined range of 0.7 to 1.3, 0.75 to 1.25, 0.8 to 1.2, 0.9 to 1.1, and/or the like. In an example embodiment, the scaled historical traffic measure may be a composite scaled historical traffic measure. For example, the scaled historical traffic measure compared to the current traffic measure may be a composite scaled traffic measure determined based on a plurality of individual scaled historical traffic measures. For example, if the first epoch is from 17:00:00 to 17:14:99 on Tuesdays, a first scaled historical traffic measure may be determined based on first historical traffic information/data for the first epoch captured on a first Tuesday, a second historical traffic measure may be determined based on second historical traffic information/data for the first epoch captured on a second Tuesday, . . . , and an nth scaled historical traffic measure may be determined based on nth historical traffic information/data for the first epoch captured on an nth Tuesday. A distribution of a plurality of scaled historical traffic measures may then be determined based on the first, second, . . . , and nth scaled historical traffic measures. The composite scaled historical traffic measure may be an average $\mu$ (e.g., mean, media, or mode) of the distribution of the plurality of scaled traffic measures. The similarity threshold value or range may also be determined based on the distribution of the plurality of scaled historical traffic measures. For example, the similarity threshold value or range may be defined by a predetermined multiple $\alpha$ (e.g., one, one and a half, two, two and a half, three, and/or the like) of the standard deviation $\sigma$ of the distribution of the plurality of scaled historical traffic measures. For example, it may be determined that the (composite) scaled historical traffic measure and the current traffic measure satisfy the similarity threshold requirement when the ratio of the (composite) scaled historical traffic measure and the current traffic measure is within the range $\mu-\alpha\sigma$ to $\mu+\alpha\sigma$. In an example embodiment, the predetermined value or range or the predetermined multiple $\alpha$ is determined based on a class of road corresponding to the first TME (e.g., based on the map information/data of the previous map version and/or the current map version).

At block 518, it is determined whether the (composite) scaled historical traffic measure and the current traffic measure satisfy the similarity threshold requirement. For example, the network apparatus 10 may determine whether the (composite) scaled historical traffic measure and the current traffic measure satisfy the similarity threshold requirement. For example, the network apparatus 10 may comprise means, such as the processor 12, memory 14, and/or the like, for determining whether the (composite) scaled historical traffic measure and the current traffic measure satisfy the similarity threshold requirement. When it is determined that the (composite) scaled historical traffic measure and the current traffic measure do satisfy the similarity threshold requirement, it is determined that the map information/data of the current map version corresponding to the first TME is up to date, traffic patterns along the first TME are as expected (based on archived and/or historical probe information/data and/or archived and/or historical traffic information/data), and/or the like. When it is determined that the (composite) scaled historical traffic measure and the current traffic measure do not satisfy the similarity threshold requirement, it is determined that the map information/data of the current map version corresponding to the first TME is not up to date and/or that traffic patterns along the first TME are not as expected (based on archived and/or historical probe information/data and/or archived and/or historical traffic information/data).

Responsive to determining that the (composite) scaled historical traffic measure and the current traffic measure do not satisfy the similarity threshold requirement, the process continues to block 520 and updated map information/data is determined, generated, and provided. For example, if the current traffic measure is lower than expected (e.g., based on the (composite) scaled historical traffic measure), it may be determined that the first TME is experiencing a complete or partial closure. For example, when the current traffic measure is lower than expected (e.g., based on the (composite) scaled historical traffic measure) a partial and/or complete closure of a first TME may be automatically identified and/or verified. If the current traffic measure is higher than expected (e.g., based on the (composite) scaled historical traffic measure), it may be determined that the first TME is experiencing heavier than usual traffic (e.g., due to a special event, a partial or complete TME closure nearby, and/or the like). Updated map information/data may be generated based on the determination regarding the traffic along the first TME. For example, when it is determined that the first TME is experiencing a partial or complete closure, updated map information/data may be generated that indicates that the first TME is experiencing a partial or complete closure. Similarly, when it is determined that the first TME is experiencing heavier traffic than usual, updated map information/data may be generated that indicates that heavier than usual traffic volume is being experienced along the first TME. For example, the network apparatus 10 may generate updated map information/data based on a determination made based on the comparison of the (composite) scaled historical traffic measure and the current traffic measure. For example, the network apparatus 10 may comprise means, such as processor 12, memory 14, and/or the like, for generating updated map information/data based on a determination made based on the comparison of the (composite) scaled historical traffic measure and the current traffic measure.

In an example embodiment, update map information/data may be integrated into a digital map and/or one or more tiles of a digital map. For example, the digital map and/or one or more tiles of the digital map may comprise a map layer comprising current (e.g., real time or near real time) traffic information/data, traffic conditions, and/or the like. For example, an indication of a complete or partial TME closure corresponding to a first TME may be added to a data record corresponding to the first TME of the digital map. For example, a network apparatus 10 may update a geographic database of a digital map and/or one or more map tiles of the digital map to include an indication of a complete or partial TME closure corresponding to the first TME.

The updated map information/data may then be provided (e.g., transmitted) such that one or more vehicle apparatuses 30 receive the updated map information/data. For example, the network apparatus 10 may then provide the updated map information/data and/or geographic database, digital map, and/or one or more map tiles of the digital map comprising the updated map information/data such that one or more vehicle apparatuses 30 receive the updated map information/data and/or geographic database, digital map, and/or one or more map tiles of the digital map comprising the updated map information/data. For example, the network apparatus 10 may comprise means, such as processor 12, memory 14, communications interface 16, and/or the like, for providing the updated map information/data and/or geographic database, digital map, and/or one or more map tiles of the digital map comprising the updated map information/data. In various embodiments, the geographic database, digital map, and/or one or more map tiles of the digital map comprise map information/data and the updated map information/data. The map information/data (including the updated map information/data) are configured for use by a vehicle apparatus 30 when performing one or more navigation functions. Some non-limiting examples of navigation functions include localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, provision of safety alerts, and/or the like. For example, the vehicle apparatus 30 may determine a route that avoids the first TME based on the updated map information/data to avoid either a closure of the first TME or the heavier than usual traffic along the first TME, in an example embodiment.

c. Example Operation of a Vehicle Apparatus

In various embodiments, a vehicle apparatus 30 onboard a vehicle 5 receives updated map information/data. In an example embodiment, the vehicle apparatus 30 receives updated map information/data as part of a geographic database, digital map, tile of a digital map, and/or the like. The vehicle apparatus 30 may store the updated map information/data, geographic database, digital map, tile of a digital map, and/or the like (e.g., in memory 34). The vehicle apparatus 30 may then use the updated map information/data and/or a portion thereof to perform one or more navigation functions.

FIG. 6 provides a flowchart illustrating operations performed, such as by the vehicle apparatus 30 to use updated map information/data to perform a navigation function, in accordance with an example embodiment. Starting at block 602, the vehicle apparatus 30 receives updated map information/data. For example, the vehicle apparatus 30 may comprise means, such as processor 32, memory 34, communication interface 36, and/or the like for receiving updated map information/data. For example, a network apparatus 10 may provide updated map information/data such that the vehicle apparatus 30 receives the updated map information/data. In various embodiments, the updated map information/data is received as part of a geographic database, digital map, and/or one or more tiles of a digital map. In various embodiments, the vehicle apparatus 30 may store the updated map information/data (e.g., as part of the geographic database, digital map, and/or one or more tiles of the digital map) in memory 34.

At block 604, update map information/data may be accessed (e.g., from memory 34) and used to perform one or more navigation functions. For example, the vehicle apparatus 30 may access updated map information/data and use the updated map information/data to perform one or more navigation functions. For example, the vehicle apparatus 30 may comprise means, such as processor 32, memory 34, communication interface 36, user interface 38, and/or the like, for accessing (e.g. from memory 34) updated map information/data and using the updated map information/data to perform one or more navigation functions. Some non-limiting examples of navigation functions include localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, provision of safety alerts, and/or the like.

Technical Advantages

Various embodiments of the present invention provide methods, apparatuses, systems, computer program products, and/or the like that allow for the efficient use of historical traffic information/data (e.g., historical and/or archived probe information/data associated with a previous map version) to be effectively used in the real time (or near real time) processing of current probe information/data based on a current map version to determine current traffic conditions (e.g., partial or complete closures) corresponding to one or more TMEs. For example, the historical traffic information/data associated with a previous map version may be used in the real time (or near real time) processing of current probe information/data corresponding to a first TME associated with a current map version to determine current traffic conditions (e.g., partial or complete closures) corresponding to the first TME even when the road geometry of the first TME of the current map version and a second TME that corresponds to the first TME in a previous map version is different. For example, the road geometry of a road segment and/or travel lane corresponding to the first and second TMEs has changed between the release of the previous map version and the release of the current map version. For example, various embodiments provide a scaling factor that may be applied to historical traffic measures generated based on the historical traffic information/data for a second TME of a previous map version that corresponds to a first TME of the current map version to generate scaled historical traffic measures that reflect the expected traffic measure for the first TME in accordance with the current map version. For example, the scaling factor is configured to modify the prediction generated based on the historical traffic information/data in a manner that accounts for the changes to the road geometry of the first TME between the release of the previous map version and the release of the current map version. Thus, various embodiments allow for the efficient use of historical traffic information/data during the real time (or near real time) processing of current probe information/data to provide accurate determinations of current traffic conditions.

As noted above, in instances where the road geometry of a TME has changed between the previous map version and the current map version, the application of historical traffic information/data during the real time (or near real time) processing of current probe information/data tends to lead to inaccurate and/or erroneous predictions. Such inaccurate and/or erroneous predictions limit the usefulness of historical traffic information/data in the real time (or near real time) processing of current probe information/data to provide accurate determinations of current traffic conditions. Various embodiments of the present invention address this technical challenge and provide a technical solution via the use of the scaling factor applied to predictions generated based on the historical traffic information/data.

Additionally, various embodiments of the present invention are configured to determine updated map information/data based on the real time (or near real time) processing of current probe information/data in light of the scaled historical traffic measures generated based on the historical traffic information/data. The updated map information/data may then be provided to vehicle apparatus 30 such that the vehicle apparatus 30 may use the updated map information/data to perform one or more navigation functions.

III. Example Apparatus

The network apparatus 10, probe apparatus 20, and/or vehicle apparatus 30 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the network apparatus 10, probe apparatus 20, and/or vehicle apparatus 30 may be embodied in other types of computing devices, such as a server, a personal computer, a computer workstation, a laptop computer, a plurality of networked computing devices or the like, that are configured to update one or more map tiles, analyze probe points for route planning or other purposes, store and/or provide driving condition information/data, generate and provide sensor quality index tables and/or driving condition tables, and/or the like. In an example embodiment, a probe apparatus 20, and/or vehicle apparatus 30 is an in-vehicle navigation system onboard a vehicle 5 or a mobile device and a network apparatus 10 is a server. In an example embodiment, a probe apparatus 20 is an apparatus configured to capture sensor information/data via one or more sensors onboard the corresponding vehicle 5. In this regard, FIG. 2A depicts an example network apparatus 10, FIG. 2B depicts an example probe apparatus 20, and FIG. 2C depicts an example vehicle apparatus 30 that may be embodied by various computing devices including those identified above. As shown, the network apparatus 10 of an example embodiment may include, may be associated with, or may otherwise be in communication with a processor 12 and a memory device 14 and optionally a communication interface 16 and/or a user interface 18. Similarly, a probe apparatus 20 of an example embodiment may include, may be associated with, or may otherwise be in communication with a processor 22 and a memory device 24 and optionally a communication interface 26, a user interface 28, one or more sensors 29 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein. In various embodiments, the one or more sensors 29 are onboard the same vehicle 5 as the probe apparatus 20. In an example embodiment, a vehicle apparatus 30 of an example embodiment may include, may be associated with, or may otherwise be in communication with a processor 32 and a memory device 34 and optionally a communication interface 36, a user interface 38, one or more sensors 39 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein. In an example embodiment the sensors 39 are onboard the same vehicle 5 as the vehicle apparatus 30.

In some embodiments, the processor 12, 22, 32 (and/or co-processors or any other processing circuitry assisting or otherwise associated with the processor) may be in communication with the memory device 14, 24, 34 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network apparatus 10, probe apparatus 20, and/or vehicle apparatus 30 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22, 32 may be embodied in a number of different ways. For example, the processor 12, 22, 32 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22, 32 may include one or more processing cores configured to perform independently. A multi-core processor may enable multiprocessing within a single physical package. Additionally or alternatively, the processor 12, 22, 32 may include one or more processors configured in tandem via the bus to enable independent execution of instructions, pipelining and/or multithreading.

In an example embodiment, the processor 12, 22, 32 may be configured to execute instructions stored in the memory device 14, 24, 34 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network apparatus 10, probe apparatus 20, and/or vehicle apparatus 30, and/or informant apparatus 40 may include a user interface 18, 28, 38 that may, in turn, be in communication with the processor 12, 22, 32 to provide output to the user, such as one or more routes through a road network, one or more notifications regarding traffic conditions along at least a portion of a route, and/or the output of one or more other navigation functions, and, in some embodiments, to receive an indication of a user input. As such, the user interface may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22, 32 (e.g., memory device 14, 24, 34 and/or the like).

The network apparatus 10, probe apparatus 20, and/or vehicle apparatus 30 may optionally include a communication interface 16, 26, 36. The communication interface 16, 26, 36 may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the network apparatus 10, probe apparatus 20, and/or vehicle apparatus 30 of an example embodiment, a navigation system may also include or have access to a geographic database. For example, in various embodiments, a network apparatus 10, probe apparatus 20, and/or vehicle apparatus 30 may comprise a component (e.g., memory 14, 24, 34, and/or another component) that stores a digital map (e.g., in the form of a geographic database) comprising a first plurality of data records, each of the first plurality of data records representing a corresponding TME, wherein at least some of said first plurality of data records map information/data (e.g., the updated map information/data) indicating current traffic conditions along the corresponding TME. For example, the geographic database may include a variety of data (e.g., map information/data) utilized in various navigation functions such as constructing a route or navigation path, determining the time to traverse the route or navigation path, matching a geolocation (e.g., a GNSS determined location) to a point on a map, a lane of a lane network, and/or link, one or more localization features and a corresponding location of each localization feature, and/or the like. For example, a geographic database may include road segment, link, or traversable map element (TME) data records, point of interest (POI) data records, localization feature data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, POI data records, and/or other data records. In an example embodiment, the network apparatus 10 may be configured to modify, update, and/or the like one or more data records of the geographic database. For example, the network apparatus 10 may modify, update, generate, and/or the like map information/data corresponding to TMEs, links, lanes, road segments, travel lanes of road segments, nodes, intersection, and/or the like and/or the corresponding data records (e.g., to add or update updated map information/data including, for example, current traffic conditions along a corresponding TME), a localization layer (e.g., comprising localization features) and/or the corresponding data records, and/or the like.

In an example embodiment, the TME data records are links, lanes, or segments, e.g., maneuvers of a maneuver graph, representing roads, travel lanes of roads, streets, or paths, as can be used in the calculated route or recorded route information for determination of one or more personalized routes. The intersection data records are ending points corresponding to the respective links or segments of the road segment data records. The TME data records and the intersection data records represent a road network, such as used by vehicles, cars, and/or other entities. Alternatively, the geographic database can contain path segment and intersection data records or nodes and connection information/data or other data that represent pedestrian paths or areas in addition to or instead of the vehicle road record data, for example.

The TMEs, road/link segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be generated and/or updated based on map information/data generated and/or extracted from probe information/data provided by probe apparatuses 30. In various embodiments, the probe apparatuses 20 may be onboard vehicles 5 owned and/or operated by and/or on behalf of members of the general public or onboard vehicles owned and/or operated as part of a private fleet.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a network apparatus 10, probe apparatus 20, and/or vehicle apparatus 30 in accordance with an example embodiment may determine the time to traverse a route that includes one or more turns at respective intersections more accurately.

IV. Apparatus, Methods, and Computer Program Products

As described above, FIGS. 3, 5, and 6 illustrate flowcharts of a network apparatus 10 probe apparatus 20, and/or vehicle apparatus 30, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24, 34 of an apparatus employing an embodiment of the present invention and executed by the processor 12, 22, 32 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving a plurality of instances of current probe data, by a network apparatus comprising a processor, a memory, and a communications interface configured to communicate via at least one network, wherein an instance of current probe data comprises location data indicating a location of a vehicle having a probe apparatus onboard when the instance of current probe data was captured by the probe apparatus;
   identifying instances of current probe data from the plurality of instances of current probe data corresponding to a first traversable map element (TME) of a current map version based on the location data of the instances of current probe data and the current map version;
   determining a current traffic measure for the first TME based on the instances of current probe data identified;
   accessing historical traffic data corresponding to a second TME of a previous map version that corresponds to the first TME of the current map version, the historical traffic data associated with the previous map version, wherein the previous map version and the current map version are different versions of a digital map and the second TME of the previous map version corresponds to the first TME of the current map version when the second TME at last partially physically overlaps with the first TME;
   determining a scaling factor, wherein the scaling factor is a function of a ratio of (a) a physical characteristic of the first TME determined based on current map data corresponding to the first TME from the current map version to (b) the physical characteristic of the second TME determined based on previous map data corresponding to the second TME from the previous map version, wherein the scaling factor represents a degree of change in the physical characteristic between the second TME and the first TME;

determining a scaled historical traffic measure for the first TME based on the historical traffic data and the scaling factor to adjust the historical traffic data in accordance with the degree of change in the physical characteristic between the second TME and the first TME;

comparing the current traffic measure and the scaled historical traffic measure; and responsive to determining that a result of the comparing the current traffic measure and the scaled historical traffic measure does not satisfy a similarity threshold requirement, generating updated map and/or traffic data corresponding to the first TME.

2. The method of claim 1, further comprising, providing the updated map data to at least one vehicle apparatus, the at least one vehicle apparatus configured to perform a navigation function based on the updated map data.

3. The method of claim 2, wherein the updated map data is provided as part of a map tile corresponding to a new map version.

4. The method of claim 1, wherein the physical characteristic of the first TME is a first length of the first TME according to the current map data, and the physical characteristic of the second TME is a second length of the second TME according to the previous map data.

5. The method of claim 1, wherein the current traffic measure is a current volume of traffic and the scaled historical traffic measure is a historical volume of traffic scaled based on the scaling factor.

6. The method of claim 5, wherein the current volume of traffic and the historical volume of traffic are both associated with an epoch.

7. The method of claim 1, wherein the historical traffic data comprises and/or is determined based on historical probe data that has been map-matched to the previous map version.

8. The method of claim 1, further comprising, responsive to determining that the result of the comparing the current traffic measure and the scaled historical traffic measure does satisfy a similarity threshold, determining that the current map data corresponding to the first TME is up to date.

9. The method of claim 1, further comprising, responsive to determining that a result of the comparing the current traffic measure and the scaled historical traffic measure does not satisfy a similarity threshold requirement, determining that the first TME or a portion of the first TME is currently closed to traffic.

10. The method of claim 1, wherein a TME is a link corresponding to a road segment or a lane corresponding to a travel lane of a road segment.

11. An apparatus comprising at least one processor, a communications interface configured for communicating via at least one network, and at least one memory storing computer program code, the at least one memory and the computer program code configured to, with the processor, cause the apparatus to at least:

receive a plurality of instances of current probe data, wherein an instance of current probe data comprises location data indicating a location of a vehicle having a probe apparatus onboard when the instance of current probe data was captured by the probe apparatus;

identify instances of current probe data from the plurality of instances of current probe data corresponding to a first traversable map element (TME) of a current map version based on the location data of the instances of current probe data and the current map version;

determine a current traffic measure for the first TME based on the instances of current probe data identified;

access historical traffic data corresponding to a second TME of a previous map version that corresponds to the first TME of the current map version, the historical traffic data associated with the previous map version, wherein the previous map version and the current map version are different versions of a digital map and the second TME of the previous map version corresponds to the first TME of the current map version when the second TME at last partially physically overlaps with the first TME;

determine a scaling factor, wherein the scaling factor is a function of a ratio of (a) a physical characteristic of the first TME determined based on current map data corresponding to the first TME from the current map version to (b) the physical characteristic of the second TME determined based on previous map data corresponding to the second TME from the previous map version, wherein the scaling factor represents a degree of change in the physical characteristic between the second TME and the first TME;

determine a scaled historical traffic measure for the first TME based on the historical traffic data and the scaling factor, wherein the scaled historical traffic measure is the historical traffic data adjusted in accordance with the degree of change in the physical characteristic between the second TME and the first TME;

compare the current traffic measure and the scaled historical traffic measure; and responsive to determining that a result of the comparing the current traffic measure and the scaled historical traffic measure does not satisfy a similarity threshold requirement, generate updated map and/or traffic data corresponding to the first TME.

12. The apparatus of claim 11, wherein the at least one memory and the computer program code are further configured to, with the processor, cause the apparatus to at least provide the updated map data to at least one vehicle apparatus, the at least one vehicle apparatus configured to perform a navigation function based on the updated map data.

13. The apparatus of claim 12, wherein the updated map data is provided as part of a map tile corresponding to a new map version.

14. The apparatus of claim 11, wherein the physical characteristic of the first TME is a first length of the first TME according to the current map data, and the physical characteristic of the second TME is a second length of the second TME according to the previous map data.

15. The apparatus of claim 11, wherein the current traffic measure is a current volume of traffic and the scaled historical traffic measure is a historical volume of traffic scaled based on the scaling factor.

16. The apparatus of claim 15, wherein the current volume of traffic and the historical volume of traffic are both associated with an epoch.

17. The apparatus of claim 11, wherein the historical traffic data comprises and/or is determined based on historical probe data that has been map-matched to the previous map version.

18. The apparatus of claim 11, wherein the at least one memory and the computer program code are further configured to, with the processor, cause the apparatus to at least, responsive to determining that the result of the comparing the current traffic measure and the scaled historical traffic measure does satisfy a similarity threshold, determine that the current map data corresponding to the first TME is up to date.

19. The apparatus of claim 11, wherein the at least one memory and the computer program code are further configured to, with the processor, cause the apparatus to at least, responsive to determining that a result of the comparing the current traffic measure and the scaled historical traffic measure does not satisfy a similarity threshold requirement, determine that the first TME or a portion of the first TME is currently closed to traffic.

20. A computer program product comprising at least one non-transitory computer-readable storage medium having computer-readable program code portions stored therein, the computer-readable program code portions comprising executable portions configured, when executed by a processor of an apparatus, to cause the apparatus to:

receive a plurality of instances of current probe data, wherein an instance of current probe data comprises location data indicating a location of a vehicle having a probe apparatus onboard when the instance of current probe data was captured by the probe apparatus;

identify instances of current probe data from the plurality of instances of current probe data corresponding to a first traversable map element (TME) of a current map version based on the location data of the instances of current probe data and the current map version;

determine a current traffic measure for the first TME based on the instances of current probe data identified;

access historical traffic data corresponding to a second TME of a previous map version that corresponds to the first TME of the current map version, the historical traffic data associated with the previous map version, wherein the previous map version and the current map version are different versions of a digital map and the second TME of the previous map version corresponds to the first TME of the current map version when the second TME at last partially physically overlaps with the first TME;

determine a scaling factor, wherein the scaling factor is a function of a ratio of (a) a physical characteristic of the first TME determined based on current map data corresponding to the first TME from the current map version to (b) the physical characteristic of the second TME determined based on previous map data corresponding to the second TME from the previous map version, wherein the scaling factor represents a degree of change in the physical characteristic between the second TME and the first TME;

determine a scaled historical traffic measure for the first TME based on the historical traffic data and the scaling factor, wherein the scaled historical traffic measure is the historical traffic data adjusted in accordance with the degree of change in the physical characteristic between the second TME and the first TME;

compare the current traffic measure and the scaled historical traffic measure; and responsive to determining that a result of the comparing the current traffic measure and the scaled historical traffic measure does not satisfy a similarity threshold requirement, generate updated map and/or traffic data corresponding to the first TME.

\* \* \* \* \*